US012361886B2

(12) United States Patent
Kim et al.

(10) Patent No.: US 12,361,886 B2
(45) Date of Patent: Jul. 15, 2025

(54) DISPLAY APPARATUS AND METHOD OF DRIVING THE SAME

(71) Applicant: SAMSUNG DISPLAY CO., LTD., Yongin-si (KR)

(72) Inventors: Keunwoo Kim, Seongnam-si (KR); Taewook Kang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/766,546

(22) Filed: Jul. 8, 2024

(65) Prior Publication Data

US 2024/0363070 A1 Oct. 31, 2024

Related U.S. Application Data

(63) Continuation of application No. 18/305,156, filed on Apr. 21, 2023, now Pat. No. 12,033,546.

(30) Foreign Application Priority Data

Jun. 7, 2022 (KR) ........................ 10-2022-0069146

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2310/0262* (2013.01); *G09G 2310/08* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS 11,107,411 B1 8/2021 Zhang et al.
2016/0351124 A1 12/2016 Kim et al.
(Continued)

FOREIGN PATENT DOCUMENTS

CN 112310169 A 2/2021
CN 112419972 A 2/2021
(Continued)

OTHER PUBLICATIONS

International Search Report dated Aug. 31, 2023, for International Application No. PCT/KR2023/007707 (3 pages).

*Primary Examiner* — Christopher J Kohlman
(74) *Attorney, Agent, or Firm* — Womble Bond Dickinson (US) LLP

(57) ABSTRACT

A display apparatus includes: a light emitting element; a driving switching element to apply a driving current to the light emitting element; and a first compensation switching element and a second compensation switching element connected in series to each other between a control electrode of the driving switching element and an output electrode of the driving switching element. A control electrode of the first compensation switching element and a control electrode of the second compensation switching element are to receive a compensation gate signal, and a falling waveform of the compensation gate signal and a rising waveform of the compensation gate signal are asymmetrical to each other.

16 Claims, 22 Drawing Sheets

(56) References Cited

U.S. PATENT DOCUMENTS

| | | | | |
|---|---|---|---|---|
| 2017/0124954 | A1* | 5/2017 | Park | G09G 3/3258 |
| 2017/0148383 | A1 | 5/2017 | Kim | |
| 2021/0036080 | A1 | 2/2021 | Kim et al. | |
| 2021/0057502 | A1 | 2/2021 | Kim et al. | |
| 2021/0233465 | A1 | 7/2021 | Lee et al. | |
| 2021/0350740 | A1* | 11/2021 | Byun | G09G 3/3233 |

FOREIGN PATENT DOCUMENTS

| | | | |
|---|---|---|---|
| KR | 10-2014-0096862 | A | 8/2014 |
| KR | 10-2017-0049787 | A | 5/2017 |
| KR | 10-2017-0060214 | A | 6/2017 |
| KR | 10-2017-0065092 | A | 6/2017 |
| KR | 10-2017-0124062 | A | 11/2017 |
| KR | 10-2021-0014817 | A | 2/2021 |
| KR | 10-2021-0022807 | A | 3/2021 |
| KR | 10-2021-0024326 | A | 3/2021 |
| KR | 10-2021-0100785 | A | 8/2021 |
| KR | 10-2021-0137328 | A | 11/2021 |

* cited by examiner

DISPLAY APPARATUS AND METHOD OF DRIVING THE SAME

CROSS-REFERENCE TO RELATED APPLICATIONS

This application is a continuation of U.S. patent application Ser. No. 18/305,156, filed Apr. 21, 2023, which claims priority to and the benefit of Korean Patent Application No. 10-2022-0069146, filed Jun. 7, 2022, the entire content of both of which is incorporated herein by reference.

BACKGROUND

1. Field

Aspects of embodiments of the present disclosure relate to a display apparatus, and a method of driving the display apparatus.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver, a data driver, an emission driver, and a driving controller. The gate driver outputs gate signals to the gate lines. The data driver outputs data voltages to the data lines. The emission driver outputs emission signals to the emission lines. The driving controller controls the gate driver, the data driver, and the emission driver.

The above information disclosed in this Background section is for enhancement of understanding of the background of the present disclosure, and therefore, it may contain information that does not constitute prior art.

SUMMARY

When an image displayed on the display panel is a static image, or the display panel is operated in an always on mode, a driving frequency of the display panel may be decreased to reduce power consumption. When the driving frequency of a display panel is decreased, a display quality thereof may be deteriorated due to a current leakage.

One or more embodiments of the present disclosure are directed to a display apparatus capable of enhancing a display quality, and a method of driving the display apparatus. For example, according to one or more embodiments, by controlling a voltage level of a node between a first compensation switching element and a second compensation switching element, the display quality of the display apparatus may be enhanced.

One or more embodiments of the present disclosure are directed to a display apparatus capable of enhancing a display quality.

One or more embodiments of the present disclosure are directed to a method of driving the display apparatus.

According to one or more embodiments of the present disclosure, a display apparatus includes: a light emitting element; a driving switching element configured to apply a driving current to the light emitting element; and a first compensation switching element and a second compensation switching element connected in series to each other between a control electrode of the driving switching element and an output electrode of the driving switching element. A control electrode of the first compensation switching element and a control electrode of the second compensation switching element are configured to receive a compensation gate signal, and a falling waveform of the compensation gate signal and a rising waveform of the compensation gate signal are asymmetrical to each other.

In an embodiment, the compensation gate signal may fall from a high level to a low level, the compensation gate signal may rise from the low level to an intermediate high level, and the compensation gate signal may rise from the intermediate high level to the high level.

In an embodiment, the compensation gate signal may rise from the low level to the intermediate high level, and may maintain the intermediate high level by a first half of an emission period, and the compensation gate signal may rise from the intermediate high level to the high level, and may maintain the high level by a second half of the emission period.

In an embodiment, the compensation gate signal may fall from a high level to a low level, the compensation gate signal may rise from the low level to the high level, and when the compensation gate signal rises from the low level to the high level, the compensation gate signal may sequentially have a first rising slew rate, and a second rising slew rate less than the first rising slew rate.

In an embodiment, the compensation gate signal may fall from a high level to a low level, the compensation gate signal may rise from the low level to the high level, and a rising slew rate of the compensation gate signal may be less than a falling slew rate of the compensation gate signal.

In an embodiment, the compensation gate signal may have a first rising slew rate for a first grayscale value that is greater than a reference grayscale value, and the compensation gate signal may have a second rising slew rate greater than the first rising slew rate for a second grayscale value that is less than the reference grayscale value.

In an embodiment, the compensation gate signal may have a first on time for the first grayscale value, and the compensation gate signal may have a second on time longer than the first on time for the second grayscale value.

In an embodiment, the display apparatus may further include a data writing switching element including a control electrode configured to receive a data writing gate signal, an input electrode configured to receive a data voltage, and an output electrode connected to an input electrode of the driving switching element.

In an embodiment, the compensation gate signal may fall when the data writing gate signal falls.

In an embodiment, the display apparatus may further include a first initialization switching element and a second initialization switching element connected in series to each other between the control electrode of the driving switching element and an applying node of an initialization voltage.

In an embodiment, a control electrode of the first initialization switching element and a control electrode of the second initialization switching element may be configured to receive a data initialization gate signal, and the compensation gate signal may fall when the data initialization gate signal rises.

In an embodiment, the display apparatus may further include a pixel including: a first pixel switching element including a control electrode connected to a first node, an input electrode connected to a second node, and an output electrode connected to a third node; a second pixel switching element including a control electrode configured to receive a data writing gate signal, an input electrode configured to receive a data voltage, and an output electrode connected to the second node; a 3-1 pixel switching element including a control electrode configured to receive the compensation gate signal, an input electrode connected to the first node, and an output electrode connected to a fourth node; a 3-2 pixel switching element including a control electrode configured to receive the compensation gate signal, an input electrode connected to the fourth node, and an output electrode connected to the third node; a 4-1 pixel switching element including a control electrode configured to receive a data initialization gate signal, an input electrode connected to a fifth node, and an output electrode connected to the first node; a 4-2 pixel switching element including a control electrode configured to receive the data initialization gate signal, an input electrode configured to receive a first initialization voltage, and an output electrode connected to the fifth node; a fifth pixel switching element including a control electrode configured to receive an emission signal, an input electrode configured to receive a first power voltage, and an output electrode connected to the second node; a sixth pixel switching element including a control electrode configured to receive the emission signal, an input electrode connected to the third node, and an output electrode connected to an anode electrode of the light emitting element; a seventh pixel switching element including a control electrode configured to receive a light emitting element initialization gate signal, an input electrode configured to receive a second initialization voltage, and an output electrode connected to the anode electrode of the light emitting element; an eighth pixel switching element including a control electrode configured to receive the light emitting element initialization gate signal, an input electrode configured to receive a bias voltage, and an output electrode connected to the second node; a storage capacitor including a first electrode configured to receive the first power voltage, and a second electrode connected to the first node; and the light emitting element including the anode electrode, and a cathode electrode configured to receive a second power voltage. The driving switching element may be the first pixel switching element, the first compensation switching element may be the 3-1 pixel switching element, and the second compensation switching element may be the 3-2 pixel switching element.

In an embodiment, the display apparatus may further include a pixel including: a first pixel switching element including a control electrode connected to a first node, an input electrode connected to a second node, and an output electrode connected to a third node; a second pixel switching element including a control electrode configured to receive a data writing gate signal, an input electrode configured to receive a data voltage, and an output electrode connected to the second node; a 3-1 pixel switching element including a control electrode configured to receive the compensation gate signal, an input electrode connected to the first node, and an output electrode connected to a fourth node; a 3-2 pixel switching element including a control electrode configured to receive the compensation gate signal, an input electrode connected to the fourth node, and an output electrode connected to the third node; a 4-1 pixel switching element including a control electrode configured to receive a data initialization gate signal, an input electrode connected to a fifth node, and an output electrode connected to the first node; a 4-2 pixel switching element including a control electrode configured to receive the data initialization gate signal, an input electrode configured to receive a first initialization voltage, and an output electrode connected to the fifth node; a fifth pixel switching element including a control electrode configured to receive an emission signal, an input electrode configured to receive a first power voltage, and an output electrode connected to the second node; a sixth pixel switching element including a control electrode configured to receive the emission signal, an input electrode connected to the third node, and an output electrode connected to an anode electrode of the light emitting element; a seventh pixel switching element including a control electrode configured to receive a light emitting element initialization gate signal, an input electrode configured to receive the first initialization voltage, and an output electrode connected to the anode electrode of the light emitting element; an eighth pixel switching element including a control electrode configured to receive the light emitting element initialization gate signal, an input electrode configured to receive a bias voltage, and an output electrode connected to the second node; a storage capacitor including a first electrode configured to receive the first power voltage, and a second electrode connected to the first node; and the light emitting element including the anode electrode, and a cathode electrode configured to receive a second power voltage. The driving switching element may be the first pixel switching element, the first compensation switching element may be the 3-1 pixel switching element, and the second compensation switching element may be the 3-2 pixel switching element.

In an embodiment, the display apparatus may further include a pixel including: a first pixel switching element including a control electrode connected to a first node, an input electrode connected to a second node, and an output electrode connected to a third node; a second pixel switching element including a control electrode configured to receive a data writing gate signal, an input electrode configured to receive a data voltage, and an output electrode connected to the second node; a 3-1 pixel switching element including a control electrode configured to receive the compensation gate signal, an input electrode connected to the first node, and an output electrode connected to a fourth node; a 3-2 pixel switching element including a control electrode configured to receive the compensation gate signal, an input electrode connected to the fourth node, and an output electrode connected to the third node; a 4-1 pixel switching element including a control electrode configured to receive a data initialization gate signal, an input electrode connected to a fifth node, and an output electrode connected to the first node; a 4-2 pixel switching element including a control electrode configured to receive the data initialization gate signal, an input electrode configured to receive a first initialization voltage, and an output electrode connected to the fifth node; a fifth pixel switching element including a control electrode configured to receive an emission signal, an input electrode configured to receive a first power voltage, and an output electrode connected to the second node; a sixth pixel switching element including a control electrode configured to receive the emission signal, an input electrode connected to the third node, and an output electrode connected to an anode electrode of the light emitting element; a seventh pixel switching element including a control electrode configured to receive a light emitting element initialization gate signal, an input electrode configured to receive a second initialization voltage, and an output electrode connected to the anode electrode of the light emitting element; a storage capacitor including a first electrode configured to receive the first power voltage, and a second electrode connected to the first node; and the light emitting element including the anode electrode, and a cathode electrode configured to receive a second power voltage. The driving switching element may be the first pixel switching element, the first compensation switching element may be the 3-1 pixel switching element, and the second compensation switching element may be the 3-2 pixel switching element.

In an embodiment, the display apparatus may further include a pixel including: a first pixel switching element including a control electrode connected to a first node, an input electrode connected to a second node, and an output electrode connected to a third node; a second pixel switching element including a control electrode configured to receive a data writing gate signal, an input electrode configured to receive a data voltage, and an output electrode connected to the second node; a 3-1 pixel switching element including a control electrode configured to receive the compensation gate signal, an input electrode connected to the first node, and an output electrode connected to a fourth node; a 3-2 pixel switching element including a control electrode configured to receive the compensation gate signal, an input electrode connected to the fourth node, and an output electrode connected to the third node; a 4-1 pixel switching element including a control electrode configured to receive a data initialization gate signal, an input electrode connected to a fifth node, and an output electrode connected to the first node; a 4-2 pixel switching element including a control electrode configured to receive the data initialization gate signal, an input electrode configured to receive a first initialization voltage, and an output electrode connected to the fifth node; a fifth pixel switching element including a control electrode configured to receive an emission signal, an input electrode configured to receive a first power voltage, and an output electrode connected to the second node; a sixth pixel switching element including a control electrode configured to receive the emission signal, an input electrode connected to the third node, and an output electrode connected to an anode electrode of the light emitting element; a seventh pixel switching element including a control electrode configured to receive a light emitting element initialization gate signal, an input electrode configured to receive the first initialization voltage, and an output electrode connected to the anode electrode of the light emitting element; a storage capacitor including a first electrode configured to receive the first power voltage, and a second electrode connected to the first node; and the light emitting element including the anode electrode, and a cathode electrode configured to receive a second power voltage. The driving switching element may be the first pixel switching element, the first compensation switching element may be the 3-1 pixel switching element, and the second compensation switching element may be the 3-2 pixel switching element.

According to one or more embodiments of the present disclosure, a display apparatus includes: a light emitting element; a driving switching element configured to apply a driving current to the light emitting element; and a first compensation switching element and a second compensation switching element connected in series to each other between a control electrode of the driving switching element and an output electrode of the driving switching element. A control electrode of the first compensation switching element and a control electrode of the second compensation switching element are configured to receive a compensation gate signal, a falling waveform of the compensation gate signal and a rising waveform of the compensation gate signal are asymmetrical to each other when a driving frequency is less than a reference frequency, and the falling waveform of the compensation gate signal and the rising waveform of the compensation gate signal are symmetrical to each other when the driving frequency is equal to or greater than the reference frequency.

In an embodiment, when the driving frequency is less than the reference frequency, the compensation gate signal may fall from a high level to a low level, may rise from the low level to an intermediate high level, and may rise from the intermediate high level to the high level.

In an embodiment, when the driving frequency is less than the reference frequency, the compensation gate signal may fall from a high level to a low level, and may rise from the low level to the high level, and when the driving frequency is less than the reference frequency and the compensation gate signal rises from the low level to the high level, the compensation gate signal may sequentially have a first rising slew rate, and a second rising slew rate less than the first rising slew rate.

In an embodiment, when the driving frequency is less than the reference frequency, the compensation gate signal may fall from a high level to a low level, and may rise from the low level to the high level, and when the driving frequency is less than the reference frequency, a rising slew rate of the compensation gate signal may be less than a falling slew rate of the compensation gate signal.

In an embodiment, when the driving frequency is less than the reference frequency, the compensation gate signal may have a first rising slew rate for a first grayscale value greater than a reference grayscale value, and when the driving frequency is less than the reference frequency, the compensation gate signal may have a second rising slew rate greater than the first rising slew rate for a second grayscale value less than the reference grayscale value.

According to one or more embodiments of the present disclosure, a method of driving a display apparatus, includes: providing a data writing gate signal and a compensation gate signal to a pixel; providing a data voltage to the pixel; and providing an emission signal to the pixel. The pixel includes: a light emitting element; a driving switching element configured to apply a driving current to the light emitting element; and a first compensation switching element and a second compensation switching element connected in series to each other between a control electrode of the driving switching element and an output electrode of the driving switching element. A control electrode of the first compensation switching element and a control electrode of the second compensation switching element are configured to receive the compensation gate signal, and a falling waveform of the compensation gate signal and a rising waveform of the compensation gate signal are asymmetrical to each other.

According to one or more embodiments of the present disclosure, when an image displayed on the display panel is a static image, or the display panel is operated in an always on mode, the driving frequency of the display panel may be decreased to reduce power consumption of the display apparatus.

According to one or more embodiments, the falling waveform and the rising waveform of the compensation gate signal applied to the control electrodes of the first compensation switching element and the second compensation switching element may be asymmetrical or substantially asymmetrical to each other, so that a voltage increase of the node between the first compensation switching element and the second compensation switching element may be prevented or substantially prevented.

According to one or more embodiments, the voltage increase of the node between the first compensation switching element and the second compensation switching element may be prevented or substantially prevented, so that the current leakage of the first compensation switching element and the second compensation switching element may be prevented or substantially prevented in the low frequency driving mode. Thus, the luminance decrease of the display panel and the flicker of the display panel may be prevented or substantially prevented in the low frequency driving mode, so that the display quality may be enhanced.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION DISCLOSURE

Figure 1:
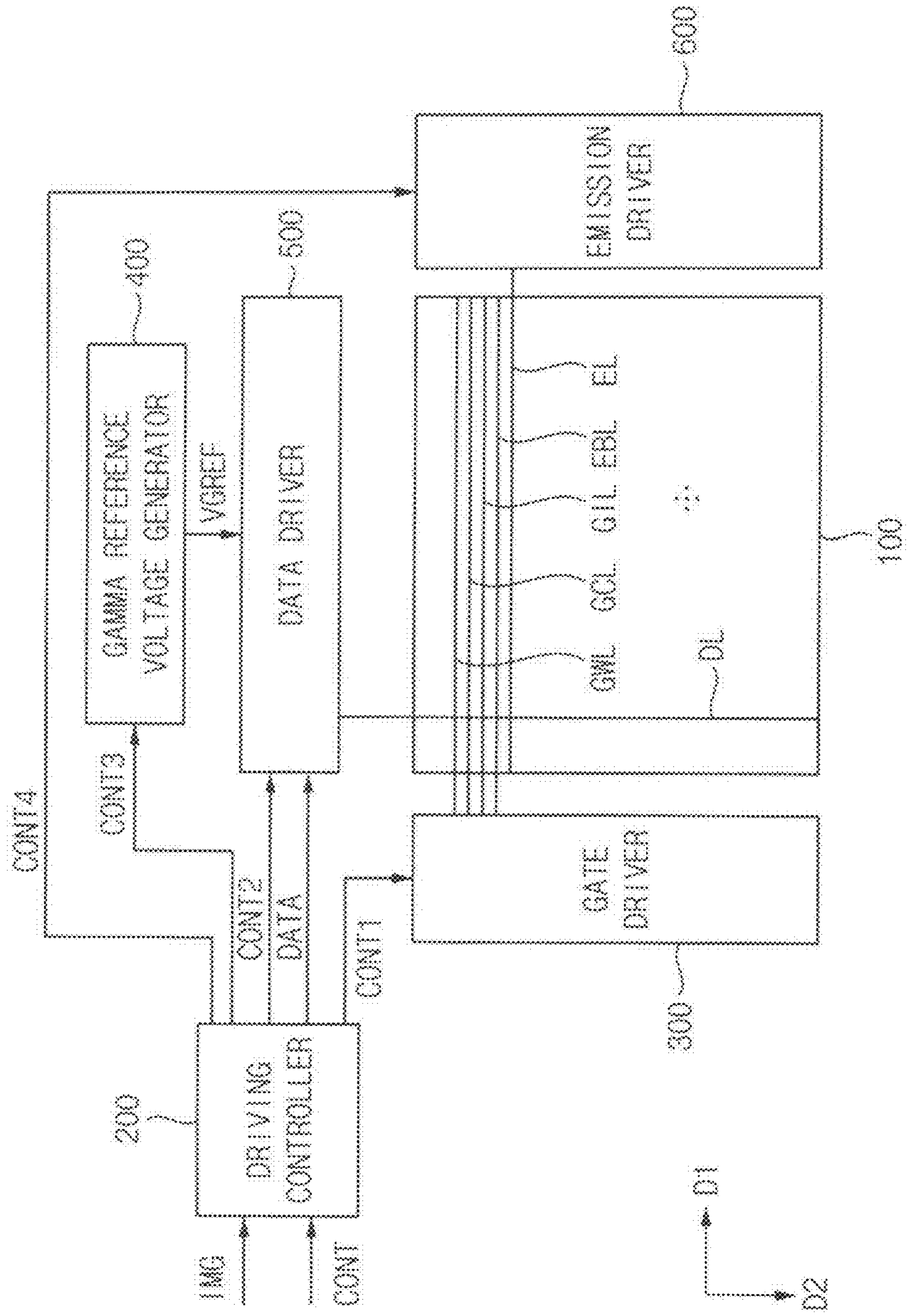
FIG. 1 is a block diagram illustrating a display apparatus according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to"

another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to an embodiment of the present disclosure.

Referring to FIG. 1, the display apparatus includes a display panel 100 and a display panel driver. The display panel driver includes a driving controller 200, a gate driver 300, a gamma reference voltage generator 400, a data driver 500, and an emission driver 600.

The display panel 100 has a display region on which an image is displayed, and a peripheral region adjacent to the display region.

The display panel 100 includes a plurality of gate lines GWL, GCL, GIL, and EBL, a plurality of data lines DL, a plurality of emission lines EL, and a plurality of pixels electrically connected to the gate lines GWL, GCL, GIL, and EBL, the data lines DL, and the emission lines EL. The gate lines GWL, GCL, GIL, and EBL may extend in a first direction D1, the data lines DL may extend in a second direction D2 crossing the first direction D1, and the emission lines EL may extend in the first direction D1.

The driving controller 200 receives input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals for driving the gate lines GWL, GCL, GIL, and EBL in response to the first control signal CONT1 received from the driving controller 200. The gate driver 300 may sequentially output the gate signals to the gate lines GWL, GCL, GIL, and EBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

Although the gate driver 300 is illustrated as being disposed at a first side of the display panel 100, and the emission driver 600 is illustrated as being disposed at a second side of the display panel 100 opposite to the first side in FIG. 1 for convenience of illustration, the present disclosure is not limited thereto. For example, both of the gate driver 300 and the emission driver 600 may be disposed at the first side of the display panel 100. For example, the gate driver 300 and the emission driver 600 may be integrally formed with each other.

Figure 2:
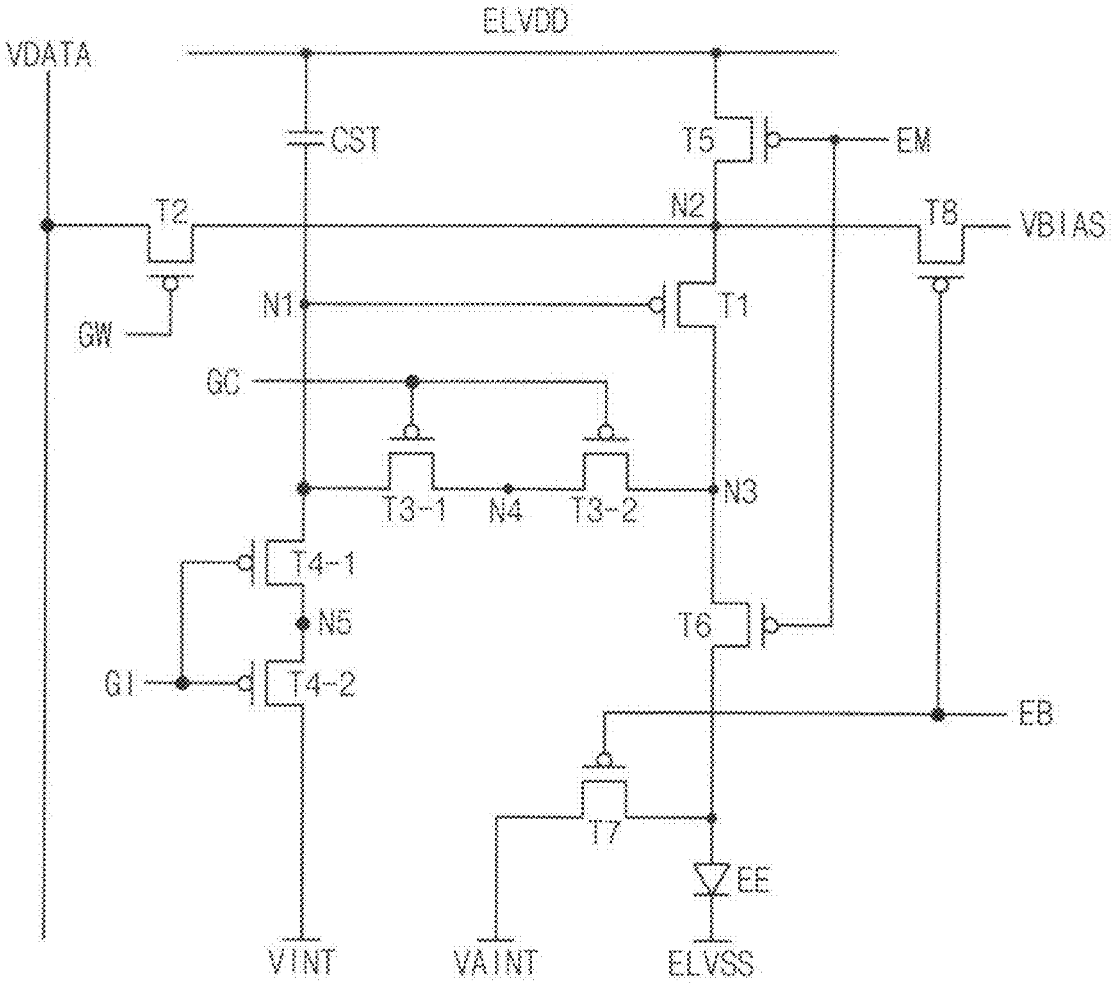
FIG. 2 is a circuit diagram illustrating a pixel of a display panel of FIG. 1.
Figure 3:
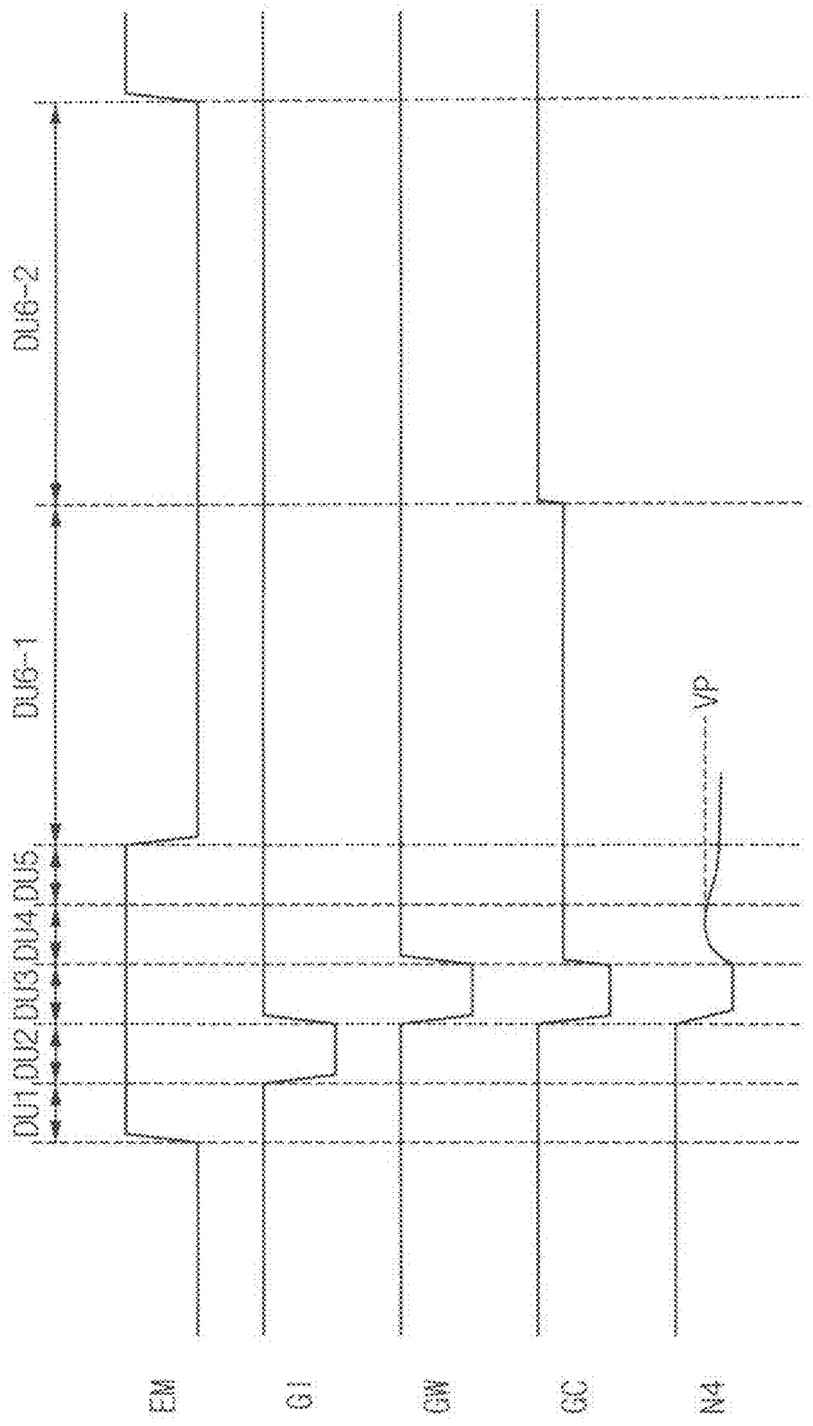
FIG. 3 is a timing diagram illustrating examples of input signals applied to the pixel of FIG. 2, and an example of a node voltage of the pixel.

FIG. 2 is a circuit diagram illustrating the pixel of the display panel 100 of FIG. 1. FIG. 3 is a timing diagram illustrating examples of input signals applied to the pixel of FIG. 2, and an example of a node voltage of the pixel.

Referring to FIGS. 1 to 3, the display panel 100 includes the plurality of the pixels. Each pixel includes a light emitting element EE.

The pixel receives a data writing gate signal GW, a compensation gate signal GC, a data initialization gate signal GI, a light emitting element initialization gate signal EB, the data voltage VDATA, and the emission signal EM. The light emitting element EE of the pixel emits light corresponding to the level of the data voltage VDATA to display an image.

The pixel may include the light emitting element EE, a driving switching element T1 for applying a driving current to the light emitting element EE, and a first compensation switching element T3-1 and a second compensation switching element T3-2 connected between a control electrode of the driving switching element T1 and an output electrode of the driving switching element T1. The first compensation switching element T3-1 and the second compensation switching element T3-2 may be connected to each other in series.

The pixel may further include a data writing switching element T2 including a control electrode for receiving the data writing gate signal GW, an input electrode for receiving the data voltage VDATA, and an output electrode connected to an input electrode of the driving switching element T1.

The pixel may further include a first initialization switching element T4-1 and a second initialization switching element T4-2 connected between the control electrode of the driving switching element T1 and an applying node of a first initialization voltage VINT. The first initialization switching element T4-1 and the second initialization switching element T4-2 may be connected to each other in series.

In other words, the pixel may include a first pixel switching element T1, a second pixel switching element T2, a 3-1 pixel switching element T3-1, a 3-2 pixel switching element T3-2, a 4-1 pixel switching element T4-1, a 4-2 pixel switching element T4-2, a fifth pixel switching element T5, a sixth pixel switching element T6, a seventh pixel switching element T7, an eighth pixel switching element T8, a storage capacitor CST, and the light emitting element EE.

The first pixel switching element T1 may include a control electrode connected to a first node N1, an input electrode connected to a second node N2, and an output electrode connected to a third node N3. The first pixel switching element T1 may be the driving switching element.

The second pixel switching element T2 may include a control electrode for receiving the data writing gate signal GW, an input electrode for receiving the data voltage VDATA, and an output electrode connected to the second node N2. The second pixel switching element T2 may be the data writing switching element.

The 3-1 pixel switching element T3-1 may include a control electrode for receiving the compensation gate signal GC, an input electrode connected to the first node N1, and an output electrode connected to a fourth node N4. The 3-1 pixel switching element T3-1 may be the first compensation switching element.

The 3-2 pixel switching element T3-2 may include a control electrode for receiving the compensation gate signal GC, an input electrode connected to the fourth node N4, and an output electrode connected to the third node N3. The 3-2 pixel switching element T3-2 may be the second compensation switching element.

The 4-1 pixel switching element T4-1 may include a control electrode for receiving the data initialization gate signal GI, an input electrode connected to a fifth node N5, and an output electrode connected to the first node N1. The 4-1 pixel switching element T4-1 may be the first initialization switching element.

The 4-2 pixel switching element T4-2 may include a control electrode for receiving the data initialization gate signal GI, an input electrode for receiving a first initialization voltage VINT, and an output electrode connected to the fifth node N5. The 4-2 pixel switching element T4-2 may be the second initialization switching element.

The fifth pixel switching element T5 may include a control electrode for receiving the emission signal EM, an input electrode for receiving a first power voltage ELVDD, and an output electrode connected to the second node N2.

The sixth pixel switching element T6 may include a control electrode for receiving the emission signal EM, an input electrode connected to the third node N3, and an output electrode connected to an anode electrode of the light emitting element EE.

The seventh pixel switching element T7 may include a control electrode for receiving the light emitting element initialization gate signal EB, an input electrode for receiving a second initialization voltage VAINT, and an output electrode connected to the anode electrode of the light emitting element EE.

The eighth pixel switching element T8 may include a control electrode for receiving the light emitting element initialization gate signal EB, an input electrode for receiving a bias voltage VBIAS, and an output electrode connected to the second node N2.

For example, the first, second, 3-1, 3-2, 4-1, 4-2, fifth, sixth, seventh, and eighth pixel switching elements T1, T2, T3-1, T3-2, T4-1, T4-2, T5, T6, T7, and T8 may be polysilicon thin film transistors. For example, the first, second, 3-1, 3-2, 4-1, 4-2, fifth, sixth, seventh, and eighth pixel switching elements T1, T2, T3-1, T3-2, T4-1, T4-2, T5, T6, T7, and T8 may be P-type thin film transistors. The control electrodes of the first, second, 3-1, 3-2, 4-1, 4-2, fifth, sixth, seventh, and eighth pixel switching elements T1, T2, T3-1, T3-2, T4-1, T4-2, T5, T6, T7, and T8 may be gate electrodes, the input electrode of the first, second, 3-1, 3-2, 4-1, 4-2, fifth, sixth, seventh, and eighth pixel switching elements T1, T2, T3-1, T3-2, T4-1, T4-2, T5, T6, T7, and T8 may be source electrodes, and the output electrode of the first, second, 3-1, 3-2, 4-1, 4-2, fifth, sixth, seventh, and eighth pixel switching elements T1, T2, T3-1, T3-2, T4-1, T4-2, T5, T6, T7, and T8 may be drain electrodes. However, the input electrode and the output electrode may be named inversely with each other. Similarly, the source electrode and the drain electrode may be named inversely with each other.

The storage capacitor CST may include a first electrode for receiving the first power voltage ELVDD, and a second electrode connected to the first node N1.

The light emitting element EE may include the anode electrode, and a cathode electrode for receiving a second power voltage ELVSS.

The compensation gate signal GC may be applied to the control electrode of the first compensation switching element (e.g. T3-1) and the control electrode of the second compensation switching element (e.g. T3-2).

Referring to FIG. 3, in the present embodiment, a falling waveform and a rising waveform of the compensation gate signal GC may be asymmetrical or substantially asymmetrical (e.g., may be set asymmetrically or substantially asymmetrically) with each other. For example, the compensation gate signal GC may fall from a high level to a low level. The compensation gate signal GC may rise from the low level to an intermediate high level, and may rise from the intermediate high level to the high level.

In more detail, during a first duration DU1, the emission signal EM, the data initialization gate signal GI, the data writing gate signal GW, and the compensation gate signal GC may have inactive levels.

During a second duration DU2 subsequent to the first duration DU1, the emission signal EM may have the inactive level, the data initialization gate signal GI may have an active level, the data writing gate signal GW may have the inactive level, and the compensation gate signal GC may have the inactive level.

During a third duration DU3 subsequent to the second duration DU2, the emission signal EM may have the inactive level, the data initialization gate signal GI may have the inactive level, the data writing gate signal GW may have an active level, and the compensation gate signal GC may have an active level.

During fourth and fifth durations DU4 and DU5 subsequent to the third duration DU3, the emission signal EM may have the inactive level, the data initialization gate signal GI may have the inactive level, the data writing gate signal GW may have the inactive level, and the compensation gate signal GC may have a second inactive level (e.g., the intermediate high level).

During a 6-1 duration DU6-1 subsequent to the fifth duration DU5, the emission signal EM may have an active level, the data initialization gate signal GI may have the inactive level, the data writing gate signal GW may have the inactive level, and the compensation gate signal GC may have the second inactive level (e.g., the intermediate high level).

During a 6-2 duration DU6-2 subsequent to the 6-1 duration DU6-1, the emission signal EM may have the active level, the data initialization gate signal GI may have the inactive level, the data writing gate signal GW may have the inactive level, and the compensation gate signal GC may have the inactive level (e.g., the high level).

For example, during the second duration DU2, the first node N1 and the storage capacitor CST may be initialized in response to the data initialization gate signal GI. During the third duration DU3, a threshold voltage |VTH| of the first pixel switching element T1 may be compensated for, and the data voltage VDATA of which the threshold voltage |VTH| is compensated for may be written to the first node N1 in response to the data writing gate signal GW and the compensation gate signal GC. During the 6-1 duration DU6-1 and the 6-2 duration DU6-2, the light emitting element EE may emit light in response to the emission signal EM, so that the display panel 100 may display an image.

In the present embodiment, when the data writing gate signal GW falls (e.g., at a boundary between DU2 and DU3), the compensation gate signal GC may fall. In addition, when the data initialization gate signal GI rises (e.g., at the boundary between DU2 and DU3), the compensation gate signal GC may fall.

In the present embodiment, when the image displayed on the display panel 100 is a static image, or the display panel is operated in an always on mode, a driving frequency of the display panel 100 may be decreased to reduce power consumption.

In addition, the display panel 100 may be driven in a variable frequency. For example, a first frame having a first frequency may include a first active period and a first blank period. A second frame having a second frequency different from the first frequency may include a second active period and a second blank period. A third frame having a third frequency different from the first frequency and the second frequency may include a third active period and a third blank period.

Herein, the first active period may have a length that is the same or substantially the same as a length of the second active period. The first blank period may have a length that is different from a length of the second blank period. The second active period may have the length that is the same or substantially the same as a length of the third active period. The second blank period may have the length that is different from a length of the third blank period.

The display apparatus for supporting the variable frequency may include a data writing period, in which the data voltage is written to the pixel, and a self scan period, in which light emission is operated without writing the data voltage to the pixel. The data writing period may be disposed in the active period. The self scan period may be disposed in the blank period.

When the display panel 100 is driven in the low frequency driving mode, the current may be leaked at the 3-1 pixel switching element T3-1 and the 3-2 pixel switching element T3-2, so that the luminance of the display panel 100 may be undesirably decreased. When the data voltage VDATA is applied to the pixel after the luminance of the display panel 100 is undesirably decreased, the luminance of the display panel 100 is increased, so that the flicker may be shown to a user.

For example, when the voltage of the fourth node N4 of FIG. 2 is changed, the voltage of the first node N1 is changed due to the voltage change of the fourth node N4, so that the luminance of the pixel may be undesirably changed. The voltage of the fourth node N4 may rise when the compensation gate signal GC rises. A high peak level VP of the voltage of the fourth node N4 may be proportional to a rising slew rate of the compensation gate signal GC, and a difference between a high level and a low level of the compensation gate signal GC.

In the present embodiment, to prevent or substantially prevent the undesirable luminance change of the pixel, the falling waveform of the compensation gate signal GC and the rising waveform of the compensation gate signal GC may be asymmetrical or substantially asymmetrical (e.g., may be set asymmetrically or substantially asymmetrically) with each other.

As illustrated in FIG. 3, the compensation gate signal GC may fall from a high level to a low level, may rise from the low level to an intermediate high level, and may rise from the intermediate high level to the high level. In the rising step, the compensation gate signal GC may rise in two stages via the intermediate high level, instead of directly rising from the low level to the high level, so that the high peak level VP of the voltage of the fourth node N4 may be decreased.

As illustrated in FIG. 3, the compensation gate signal GC may rise from the low level to the intermediate high level, and may maintain or substantially maintain the intermediate high level by a first half (e.g., DU6-1) of the emission period. Then, the compensation gate signal GC may rise from the intermediate high level to the high level, and may maintain or substantially maintain the high level by a second half (e.g., DU6-2) of the emission period. In FIG. 3, the emission period may be defined as a period from an end time of the fifth duration DU5 to a start time of the first duration DU1 of a next frame. However, the time when the compensation gate signal GC maintains or substantially maintains the intermediate high level may not be limited to the first half (e.g., DU6-1) of the emission period. For example, the time when the compensation gate signal GC maintains or substantially maintains the intermediate high level may be included in the emission period.

According to the present embodiment, when the image displayed on the display panel 100 is a static image, or the display panel 100 is operated in the always on mode, the driving frequency of the display panel 100 may be decreased to reduce the power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 4:
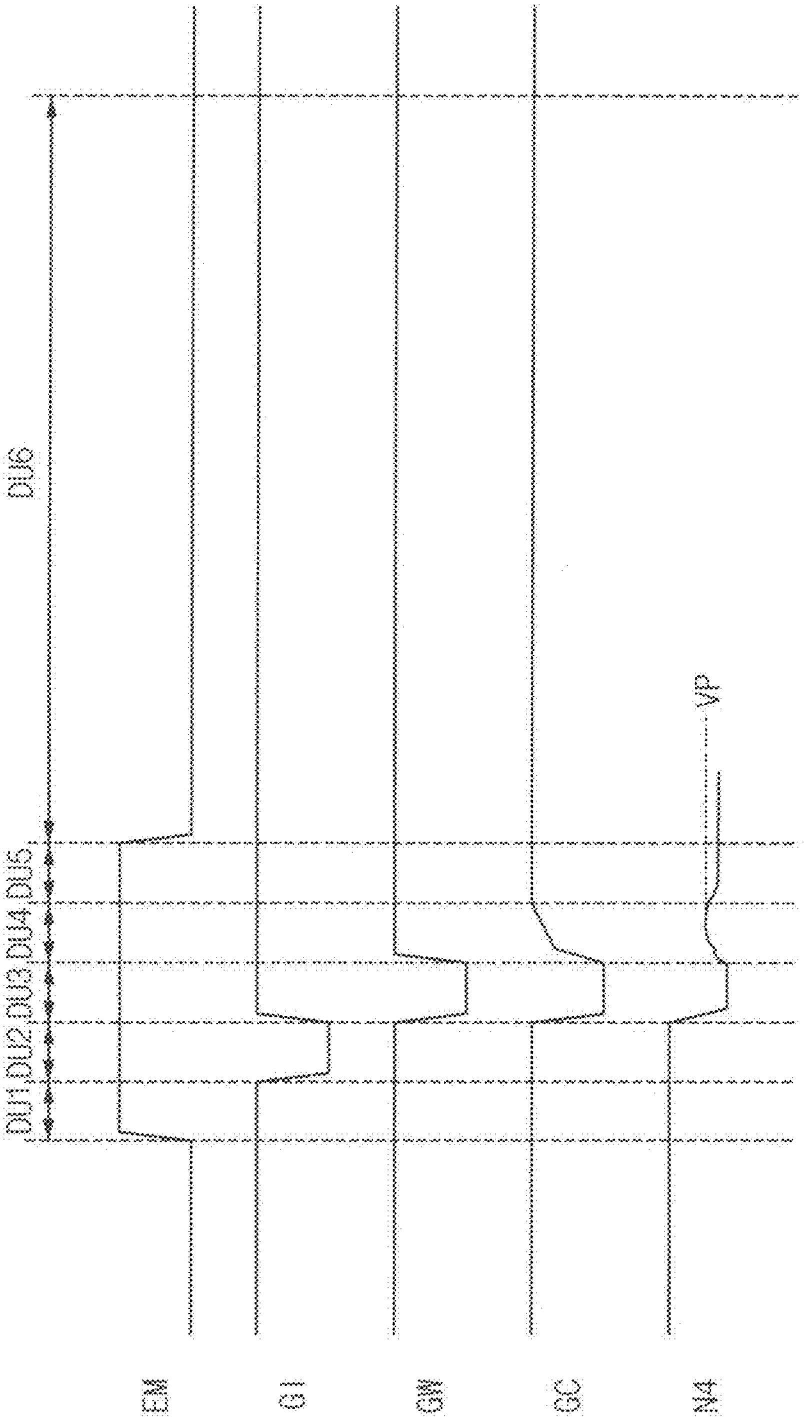
FIG. 4 is a timing diagram illustrating examples of input signals applied to the pixel of FIG. 2, and an example of a node voltage of the pixel.

FIG. 4 is a timing diagram illustrating examples of input signals applied to the pixel of FIG. 2 and an example of a node voltage of the pixel of FIG. 2.

The display apparatus according to the present embodiment is substantially the same as the display apparatus of the previous embodiment explained referring to FIGS. 1 to 3 except for the waveform of the compensation gate signal GC. Thus, the same reference numerals will be used to refer to the same or like parts as those described in the previous embodiment of FIGS. 1 to 3 and any repetitive explanation concerning the above elements will be omitted.

As shown in FIG. 4, in the present embodiment, a falling waveform and a rising waveform of the compensation gate signal GC may be asymmetrical or substantially asymmetrical (e.g., may be set asymmetrically or substantially asymmetrically) with each other. For example, the compensation gate signal GC may fall from a high level to a low level, and may rise from the low level to the high level.

When the compensation gate signal GC rises from the low level to the high level, the compensation gate signal GC may sequentially have a first rising slew rate, and a second rising slew rate less than the first rising slew rate.

Herein, the rising slew rate of the compensation gate signal GC may refer to a degree of increase of the compensation gate signal GC in a short time (e.g., a predetermined time). When an increasing gradient of the compensation gate signal GC is great in the waveform diagram, the rising slew rate of the compensation gate signal GC may be great. When the increasing gradient of the compensation gate signal GC is small in the waveform diagram, the rising slew rate of the compensation gate signal GC may be small.

Herein, the falling slew rate of the compensation gate signal GC may refer to a degree of decrease of the compensation gate signal GC in a short (e.g., a predetermined time). When an absolute value of a decreasing gradient of the compensation gate signal GC is great in the waveform diagram, the falling slew rate of the compensation gate signal GC may be great. When the absolute value of the decreasing gradient of the compensation gate signal GC is small in the waveform diagram, the falling slew rate of the compensation gate signal GC may be small.

For example, during a first duration DU1, the emission signal EM, the data initialization gate signal GI, the data writing gate signal GW, and the compensation gate signal GC may have inactive levels.

During a second duration DU2 subsequent to the first duration DU1, the emission signal EM may have the inactive level, the data initialization gate signal GI may have an active level, the data writing gate signal GW may have the inactive level, and the compensation gate signal GC may have the inactive level.

During a third duration DU3 subsequent to the second duration DU2, the emission signal EM may have the inactive level, the data initialization gate signal GI may have the inactive level, the data writing gate signal GW may have an active level, and the compensation gate signal GC may have an active level.

During fourth and fifth durations DU4 and DU5 subsequent to the third duration DU3, the emission signal EM may have the inactive level, the data initialization gate signal GI may have the inactive level, the data writing gate signal GW may have the inactive level, and the compensation gate signal GC may have the inactive level.

During a sixth duration DU6 subsequent to the fifth duration DU5, the emission signal EM may have an active level, the data initialization gate signal GI may have the inactive level, the data writing gate signal GW may have the inactive level, and the compensation gate signal GC may have the inactive level.

When the display panel 100 is driven in the low frequency driving mode, the current may be leaked at the 3-1 pixel switching element T3-1 and the 3-2 pixel switching element T3-2, so that the luminance of the display panel 100 may be undesirably decreased. When the data voltage VDATA is applied to the pixel after the luminance of the display panel 100 is undesirably decreased, the luminance of the display panel 100 is increased, so that the flicker may be shown to a user.

For example, when the voltage of the fourth node N4 of FIG. 2 is changed, the voltage of the first node N1 is changed due to the voltage change of the fourth node N4, so that the luminance of the pixel may be undesirably changed. The voltage of the fourth node N4 may rise when the compensation gate signal GC rises. A high peak level VP of the voltage of the fourth node N4 may be proportional to a rising slew rate of the compensation gate signal GC, and a difference between a high level and a low level of the compensation gate signal GC.

In the present embodiment, to prevent or substantially prevent the undesirable luminance change of the pixel, the falling waveform of the compensation gate signal GC and the rising waveform of the compensation gate signal GC may be asymmetrical or substantially asymmetrical (e.g., may be set asymmetrically or substantially asymmetrically) with each other.

In FIG. 4, the compensation gate signal GC may fall from a high level to a low level, and may rise from the low level to the high level. When the compensation gate signal GC rises from the low level to the high level, the compensation gate signal GC may sequentially have the first rising slew rate, and the second rising slew rate less than the first rising slew rate. In the rising step, the compensation gate signal GC may have two different rising slew rates, and the high peak level VP of the voltage of the fourth node N4 may be decreased due to the relatively little slew rate.

According to the present embodiment, when the image displayed on the display panel 100 is a static image, or the display panel 100 is operated in the always on mode, the driving frequency of the display panel 100 may be decreased to reduce the power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 5:
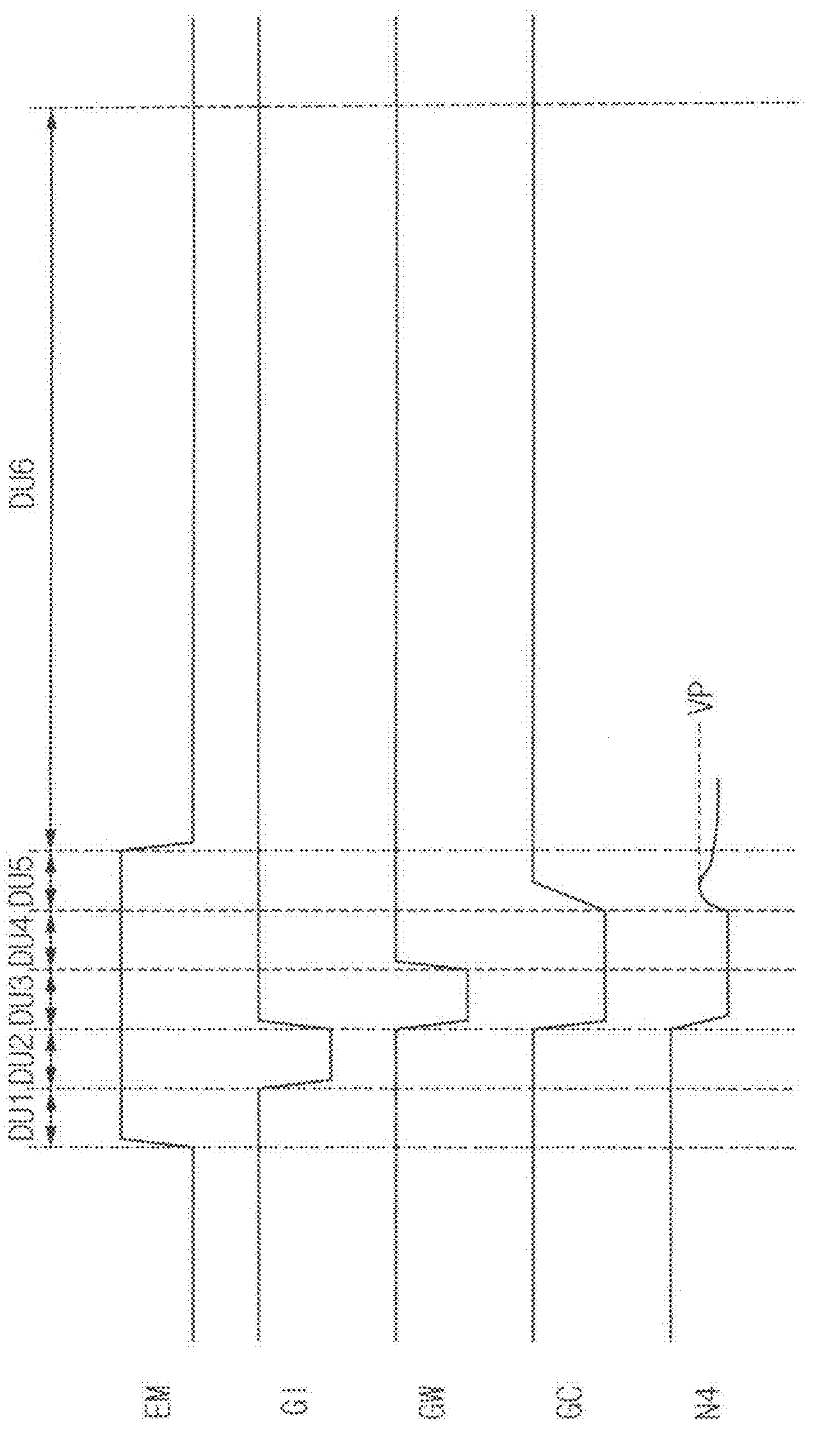
FIG. 5 is a timing diagram illustrating examples of input signals applied to the pixel of FIG. 2, and an example of a node voltage of the pixel.

FIG. 5 is a timing diagram illustrating examples of input signals applied to the pixel of FIG. 2, and an example of a node voltage of the pixel.

The display apparatus according to the present embodiment is the same or substantially the same as the display apparatus described above with reference to FIGS. 1 to 3, except for the waveform of the compensation gate signal GC may be different. Accordingly, the same reference numerals are used to refer to the same or substantially the same (or similar or like) parts as those described above with reference to FIGS. 1 to 3, and redundant description thereof may not be repeated.

As shown in FIG. 5, in the present embodiment, a falling waveform and a rising waveform of the compensation gate signal GC may be asymmetrical or substantially asymmetrical (e.g., may be set asymmetrically or substantially asymmetrically) with each other. For example, the compensation gate signal GC may fall from a high level to a low level, and may rise from the low level to the high level.

The rising slew rate of the compensation gate signal GC may be less than the falling slew rate of the compensation gate signal GC. The high peak level VP of the voltage of the fourth node N4 may be decreased due to the relatively little rising slew rate.

According to the present embodiment, when the image displayed on the display panel 100 is a static image, or the display panel 100 is operated in the always on mode, the driving frequency of the display panel 100 may be decreased to reduce the power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 6A:
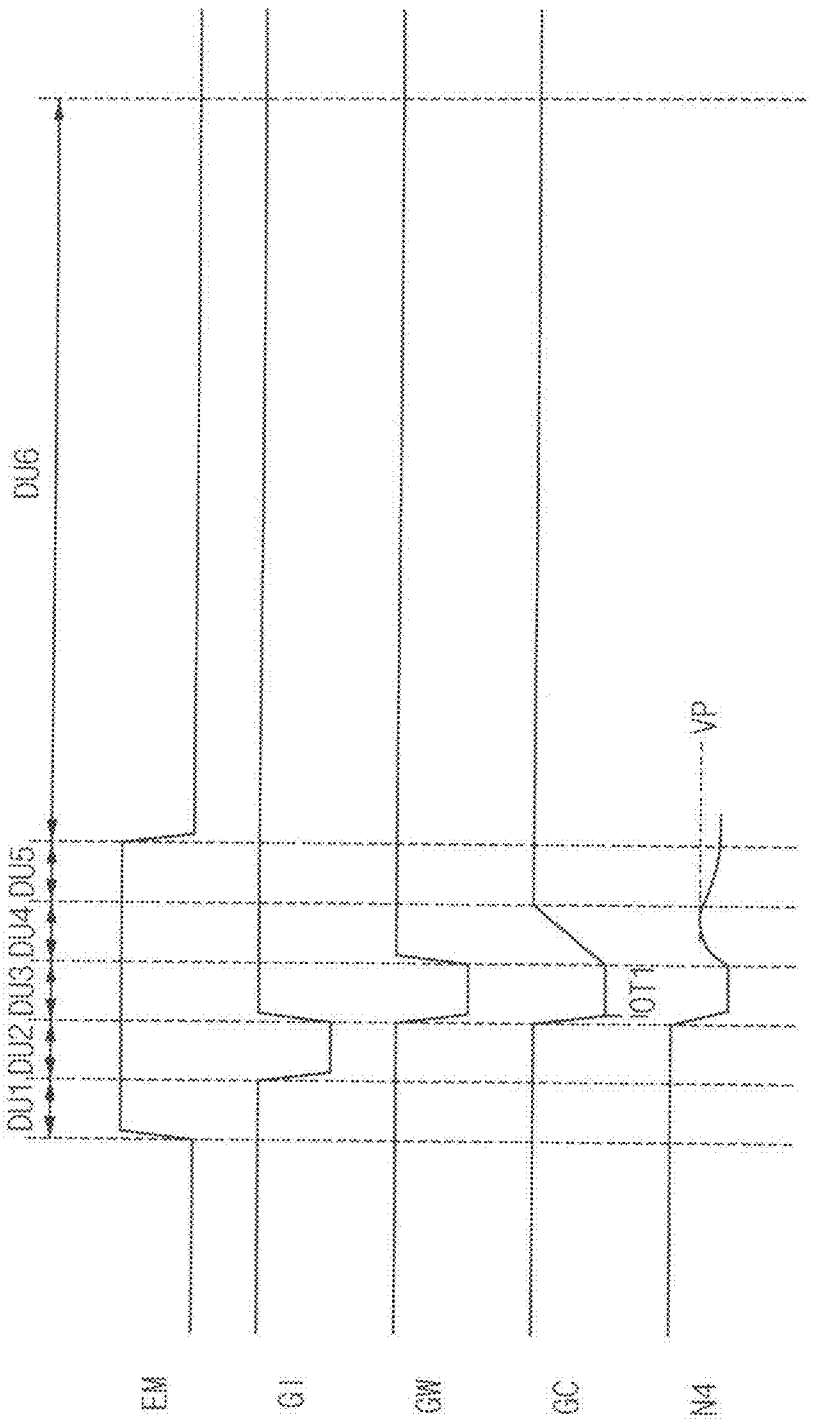
FIG. 6A is a timing diagram illustrating examples of input signals applied to the pixel of FIG. 2, and an example of a node voltage of the pixel in a high grayscale value.
Figure 6B:
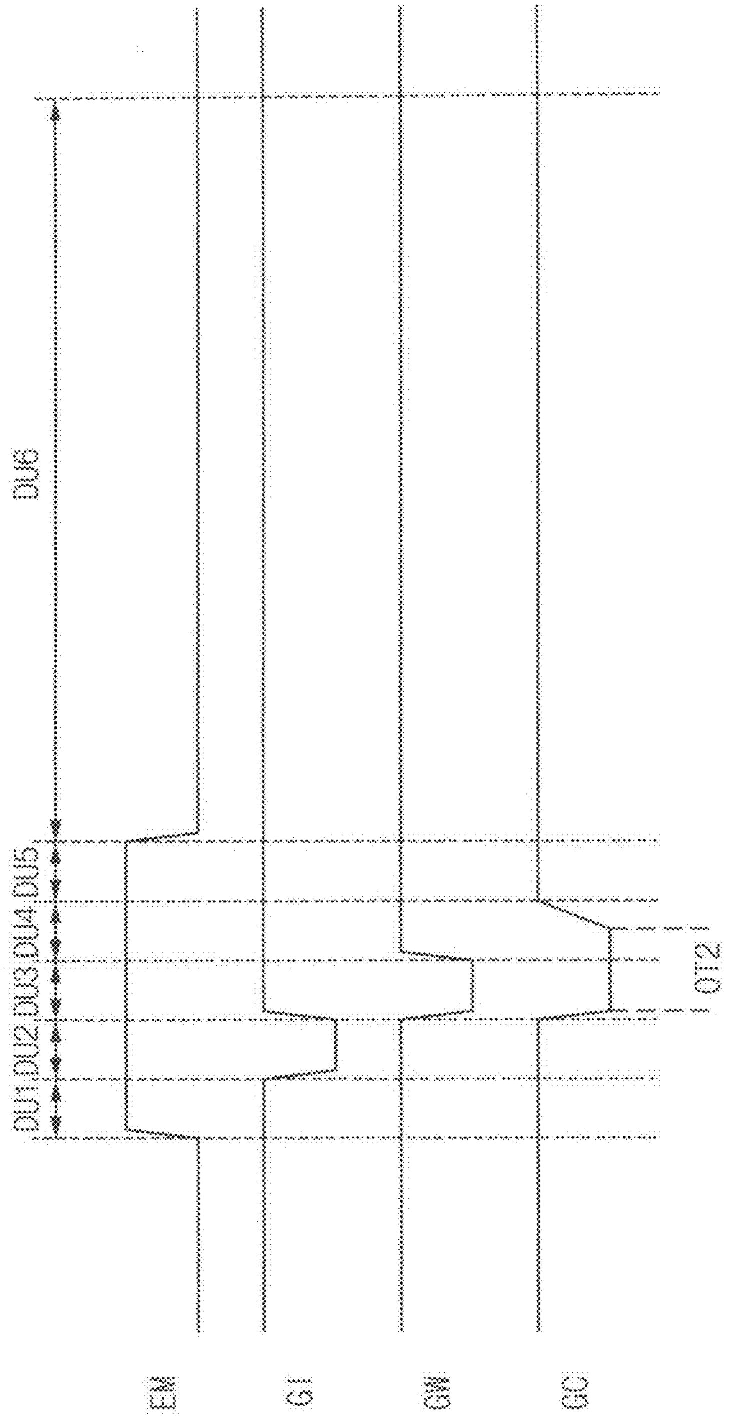
FIG. 6B is a timing diagram illustrating examples of input signals applied to the pixel of FIG. 2, and an example of a node voltage of the pixel in a low grayscale value.

FIG. 6A is a timing diagram illustrating examples of input signals applied to the pixel of FIG. 2, and an example of a node voltage of the pixel in a high grayscale value. FIG. 6B is a timing diagram illustrating examples of input signals applied to the pixel of FIG. 2, and an example of a node voltage of the pixel in a low grayscale value.

The display apparatus according to the present embodiment is the same or substantially the same as the display apparatus described above with reference to FIGS. 1 to 3, except for the waveform of the compensation gate signal GC may be different. Thus, the same reference numerals are used to refer to the same or substantially the same (or similar or like) parts as those described above with reference to FIGS. 1 to 3, and redundant description thereof may not be repeated.

The level of the gate voltage of the driving switching element T1 is relatively higher in the high grayscale value than in the low grayscale value, so that the luminance change due to the increase of the voltage of the fourth node N4 may be more serious (e.g., more noticeable) in the high grayscale value than in the low grayscale value.

FIG. 6A represents a case in which the display image of the display panel 100 has the high grayscale value, and FIG. 6B represents a case in which the display image of the display panel 100 has the low grayscale value.

As shown in FIG. 6A, the compensation gate signal GC may have a first rising slew rate for a first grayscale value (e.g., the high grayscale value) that is greater than a reference grayscale value.

In comparison, as shown in FIG. 6B, the compensation gate signal GC may have a second rising slew rate that is greater than the first rising slew rate for a second grayscale value (e.g., the low grayscale value) that is less than the reference grayscale value.

In addition, as shown in FIG. 6A, the compensation gate signal GC may have a first on time OT1 for the first grayscale value.

In comparison, as shown in FIG. 6B, the compensation gate signal GC may have a second on time OT2 longer than the first on time OT1 for the second grayscale value. The first on time OT1 and the second on time OT2 may refer to a time duration when the compensation gate signal GC maintains or substantially maintains a minimum or low level.

The first rising slew rate of the compensation gate signal GC for the high grayscale value may be less than the second rising slew rate of the compensation gate signal GC for the low grayscale value. The high peak level VP of the voltage of the fourth node N4 may be decreased due to the relatively little rising slew rate.

According to the present embodiment, when the image displayed on the display panel 100 is a static image, or the display panel 100 is operated in the always on mode, the driving frequency of the display panel 100 may be decreased to reduce the power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 7:
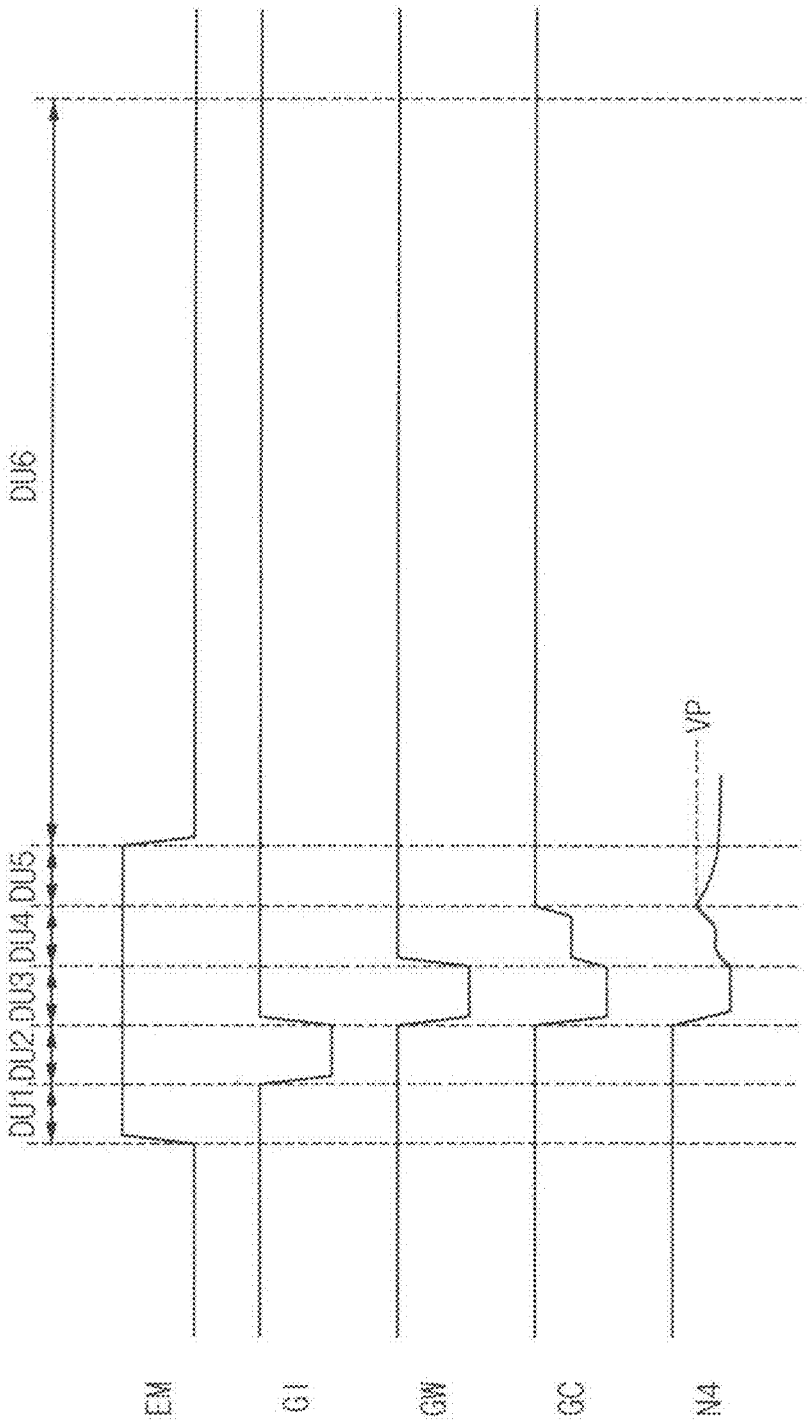
FIG. 7 is a timing diagram illustrating examples of input signals applied to the pixel of FIG. 2, and an example of a node voltage of the pixel.

FIG. 7 is a timing diagram illustrating examples of input signals applied to the pixel of FIG. 2, and an example of a node voltage of the pixel.

The display apparatus according to the present embodiment is the same or substantially the same as the display apparatus described above with reference to FIGS. 1 to 3, except for the waveform of the compensation gate signal GC may be different. Thus, the same reference numerals are used to refer to the same or substantially the same (or similar or like) parts as those described above with reference to FIGS. 1 to 3, and redundant description thereof may not be repeated.

As shown in FIG. 7, in the present embodiment, a falling waveform and a rising waveform of the compensation gate signal GC may be asymmetrical or substantially asymmetrical (e.g., may be set asymmetrically or substantially asymmetrically) with each other. For example, the compensation gate signal GC may fall from a high level to a low level, may rise from the low level to an intermediate high level, and may rise from the intermediate high level to the high level.

In FIG. 7, in the rising step, the compensation gate signal GC may rise in two stages via the intermediate high level, instead of directly rising from the low level to the high level, so that the high peak level VP of the voltage of the fourth node N4 may be decreased.

According to the present embodiment, when the image displayed on the display panel 100 is a static image, or the display panel 100 is operated in the always on mode, the driving frequency of the display panel 100 may be decreased to reduce the power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 8A:
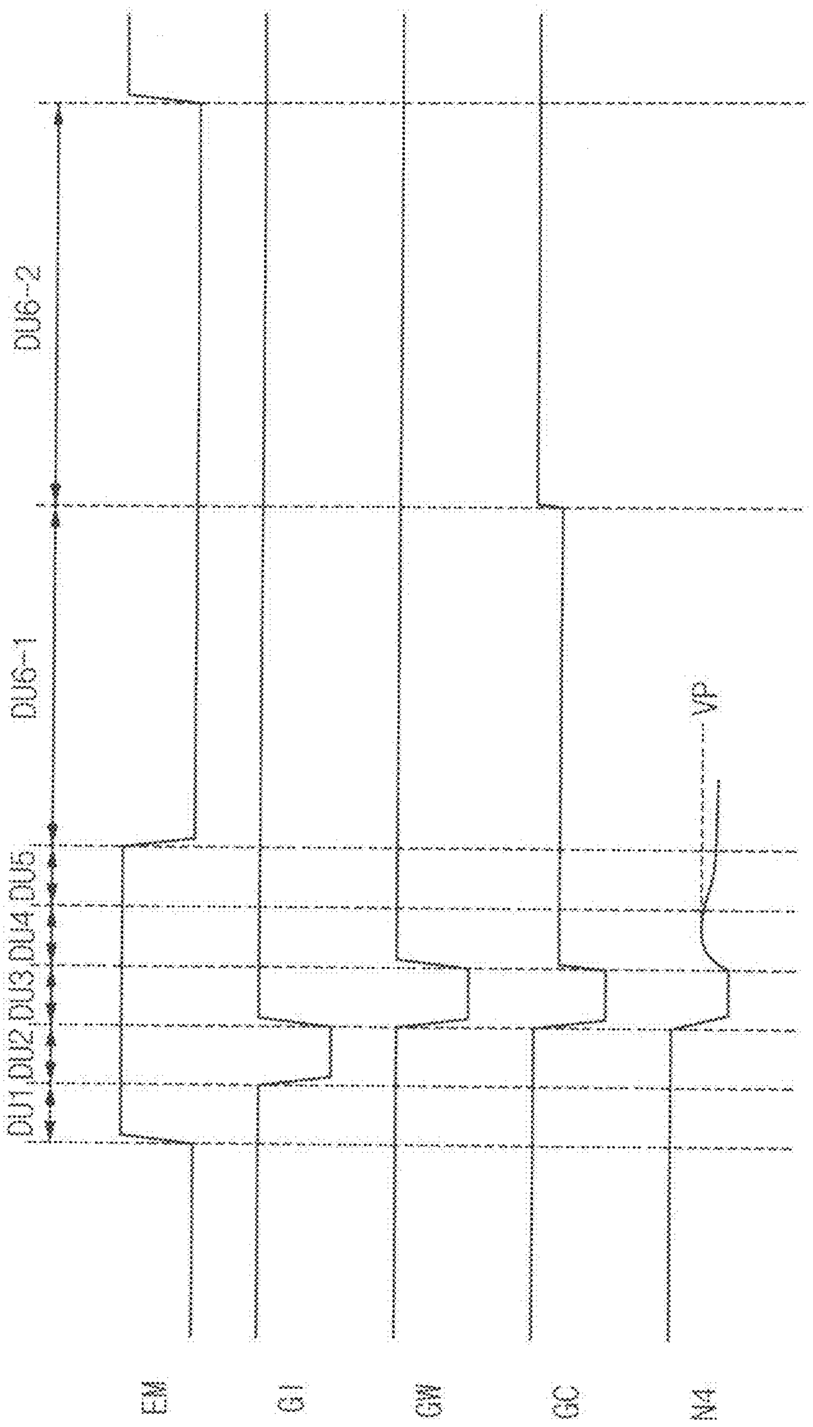
FIG. 8A is a timing diagram illustrating examples of input signals applied to the pixel of FIG. 2, and an example of a node voltage of the pixel in a low frequency driving mode.
Figure 8B:
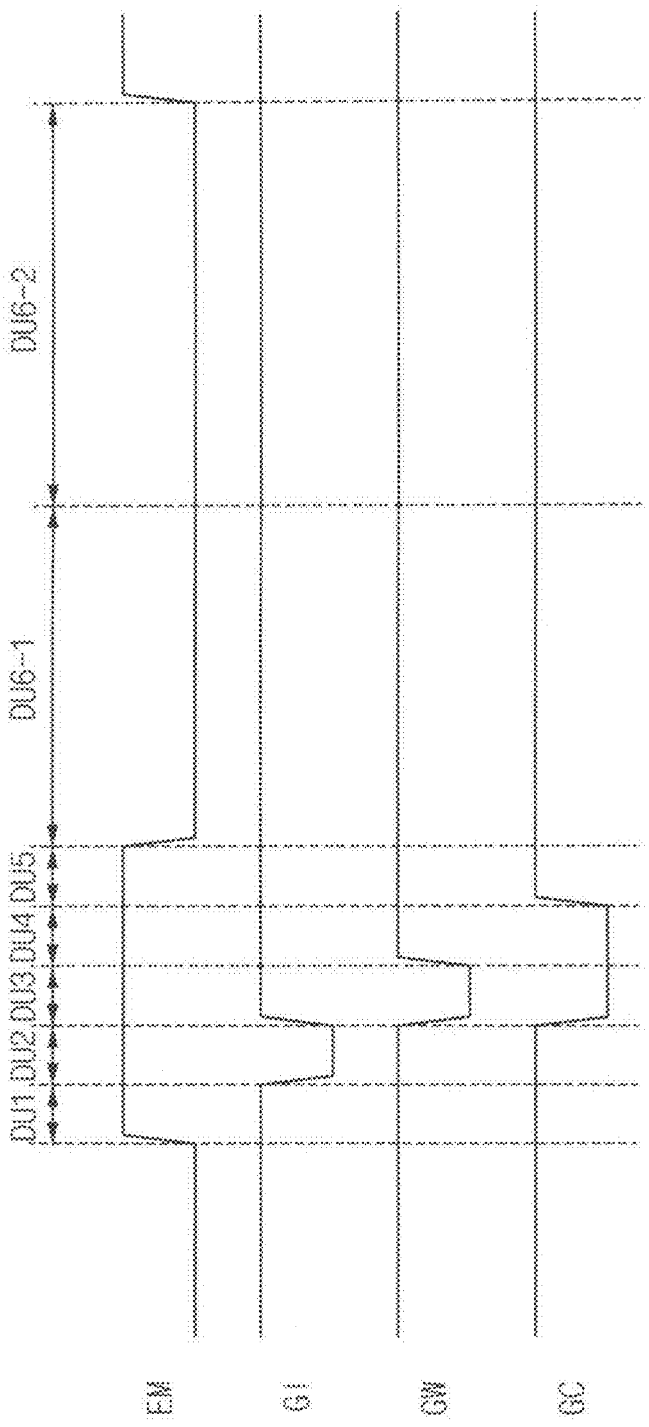
FIG. 8B is a timing diagram illustrating examples of input signals applied to the pixel of FIG. 2, and an example of a node voltage of the pixel in a high frequency driving mode.

FIG. 8A is a timing diagram illustrating examples of input signals applied to the pixel of FIG. 2, and an example of a node voltage of the pixel in a low frequency driving mode. FIG. 8B is a timing diagram illustrating examples of input signals applied to the pixel of FIG. 2, and an example of a node voltage of the pixel in a high frequency driving mode.

The display apparatus according to the present embodiment is the same or substantially the same as the display apparatus described above with reference to FIGS. 1 to 3, except for the waveform of the compensation gate signal GC may be different. Thus, the same reference numerals are used to refer to the same or substantially the same (or similar or like) parts as those described above with reference to FIGS. 1 to 3, and redundant description thereof may not be repeated.

In FIGS. 8A and 8B, the waveform of the compensation gate signal GC in the low frequency driving mode and in the high frequency driving mode may be different (e.g., may be differently set) from each other.

When a driving frequency is less than a reference frequency, the falling waveform of the compensation gate signal GC and the rising waveform of the compensation gate signal GC may be asymmetrical or substantially asymmetrical (e.g., may be set asymmetrically or substantially asymmetrically) with each other. When the driving frequency is equal to or greater than the reference frequency, the falling waveform of the compensation gate signal GC and the rising waveform of the compensation gate signal GC may be symmetrical or substantially symmetrical (e.g., may be set symmetrically or substantially symmetrically) with each other. When the falling waveform of the compensation gate signal GC and the rising waveform of the compensation gate signal GC are symmetrical or substantially symmetrical (e.g., may be set symmetrically or substantially symmetrically) with each other, an absolute value of a falling slew rate of the compensation gate signal GC may be equal to or substantially equal to an absolute value of a rising slew rate of the compensation gate signal GC.

The waveform of the compensation gate signal GC in the driving frequency less than the reference frequency may be the same or substantially the same as the waveform of the compensation gate signal GC shown in FIG. 3. When the driving frequency is less than the reference frequency, the compensation gate signal GC may fall from a high level to a low level, may rise from the low level to an intermediate high level, and may rise from the intermediate high level to the high level.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 9A:
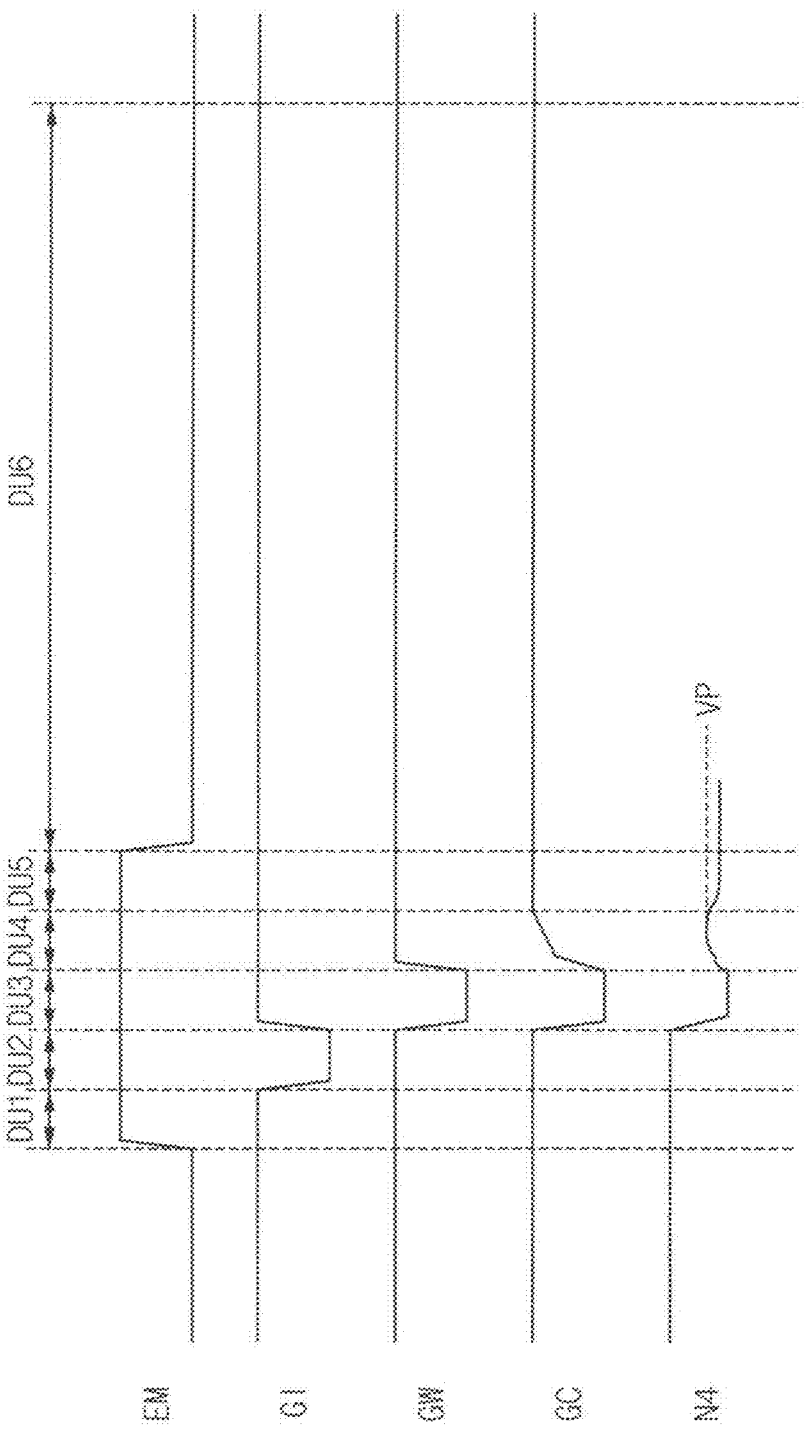
FIG. 9A is a timing diagram illustrating examples of input signals applied to the pixel of FIG. 2, and an example of a node voltage of the pixel in the low frequency driving mode.
Figure 9B:
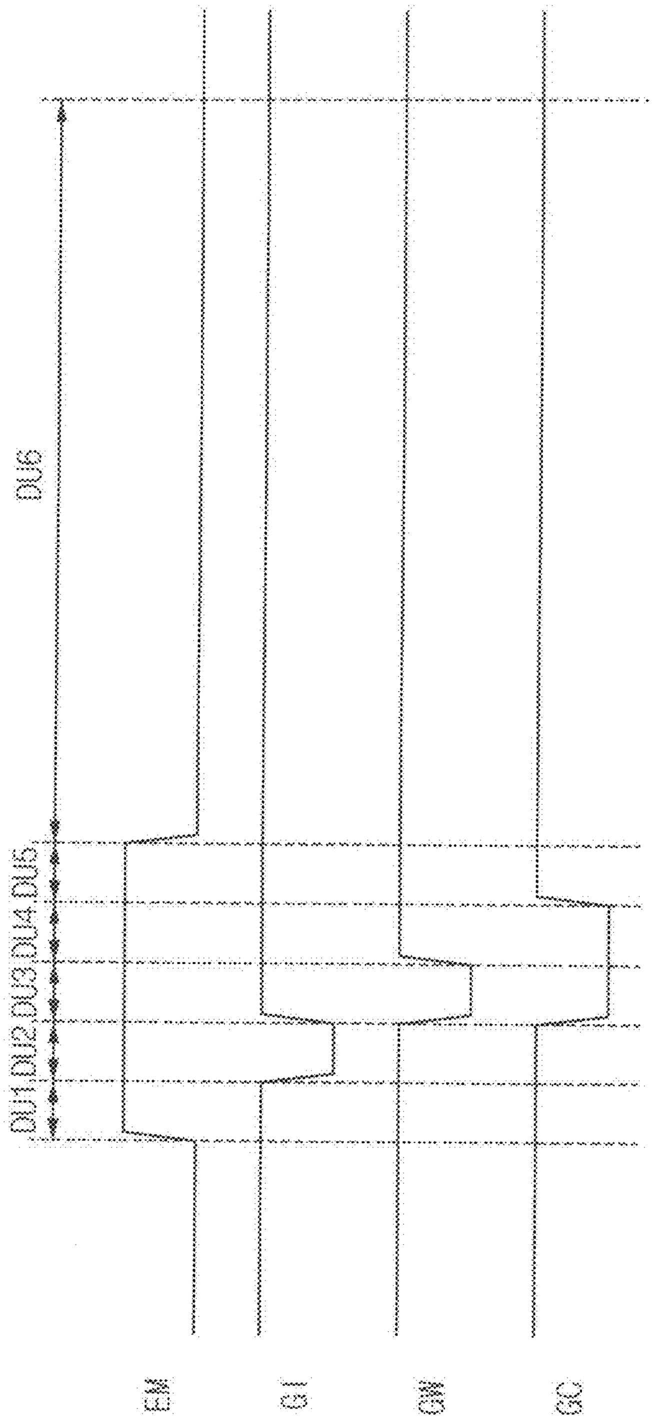
FIG. 9B is a timing diagram illustrating examples of input signals applied to the pixel of FIG. 2, and an example of a node voltage of the pixel in the high frequency driving mode.

FIG. 9A is a timing diagram illustrating examples of input signals applied to the pixel of FIG. 2, and an example of a node voltage of the pixel in the low frequency driving mode. FIG. 9B is a timing diagram illustrating examples of input signals applied to the pixel of FIG. 2, and an example of a node voltage of the pixel in the high frequency driving mode.

The display apparatus according to the present embodiment is the same or substantially the same as the display apparatus described above with reference to FIGS. 1, 2, and 4, except for the waveform of the compensation gate signal GC may be different. Thus, the same reference numerals are used to refer to the same or substantially the same (or similar or like) parts as those described above with reference to FIGS. 1, 2, and 4, and redundant description thereof may not be repeated.

In FIGS. 9A and 9B, the waveform of the compensation gate signal GC in the low frequency driving mode and in the high frequency driving mode may be different (e.g., may be differently set) from each other.

When a driving frequency is less than a reference frequency, the falling waveform of the compensation gate signal GC and the rising waveform of the compensation gate signal GC may be asymmetrical or substantially asymmetrical (e.g., may be set asymmetrically or substantially asymmetrically) with each other. When the driving frequency is equal to or greater than the reference frequency, the falling waveform of the compensation gate signal GC and the rising waveform of the compensation gate signal GC may be symmetrical or substantially symmetrical (e.g., may be set symmetrically or substantially symmetrically) with each other. When the falling waveform of the compensation gate signal GC and the rising waveform of the compensation gate signal GC are symmetrical or substantially symmetrical (e.g., may be set symmetrically or substantially symmetrically) with each other, an absolute value of a falling slew rate of the compensation gate signal GC may be equal to or substantially equal to an absolute value of a rising slew rate of the compensation gate signal GC.

The waveform of the compensation gate signal GC in the driving frequency less than the reference frequency may be the same or substantially the same as the waveform of the compensation gate signal GC shown in FIG. 4. When the driving frequency is less than the reference frequency, the compensation gate signal GC may fall from a high level to a low level, and may rise from the low level to the high level. When the driving frequency is less than the reference frequency and the compensation gate signal GC rises from the low level to the high level, the compensation gate signal GC may sequentially have a first rising slew rate, and a second rising slew rate less than the first rising slew rate.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 10A:
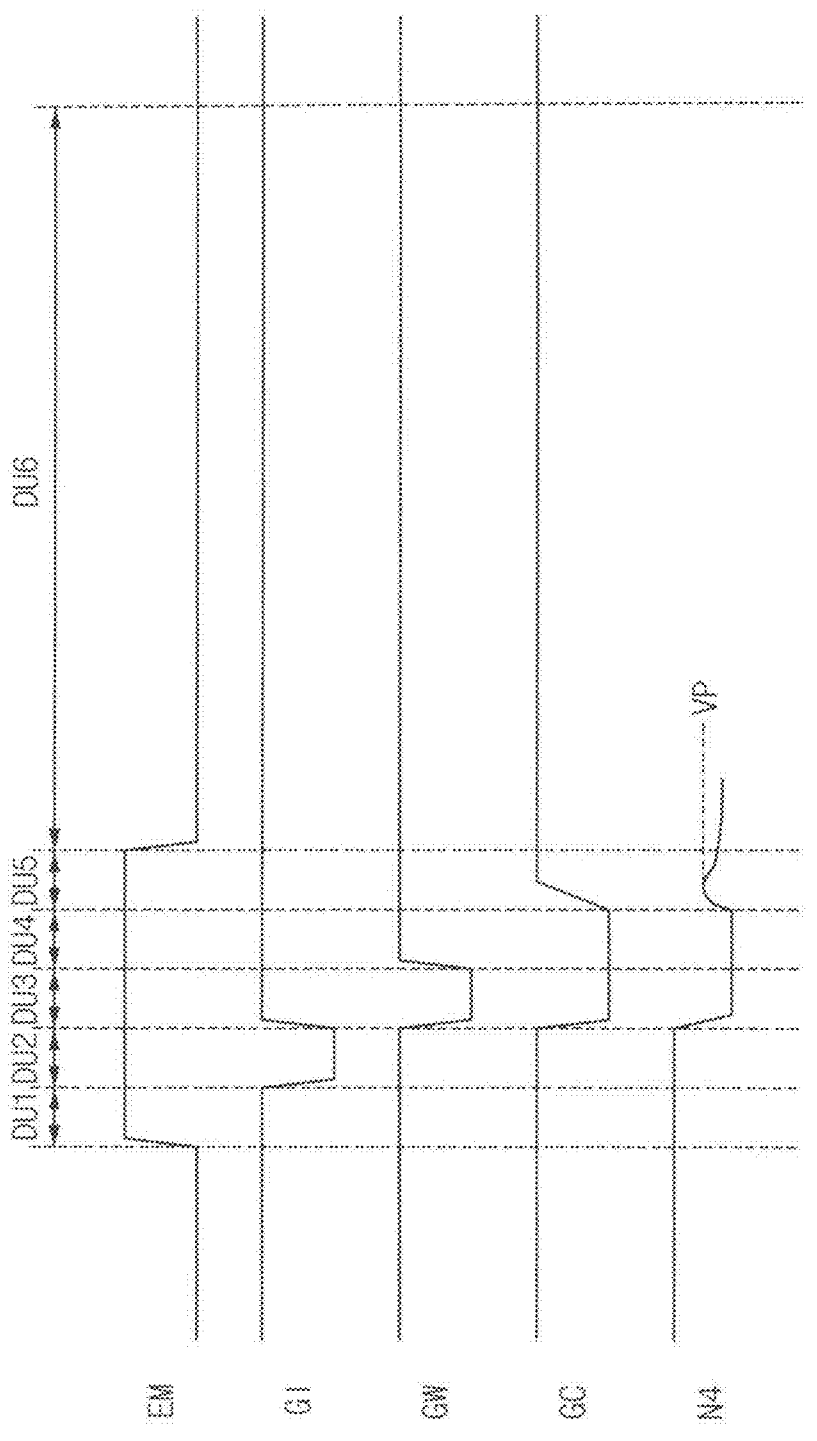
FIG. 10A is a timing diagram illustrating examples of input signals applied to the pixel of FIG. 2, and an example of a node voltage of the pixel in the low frequency driving mode.
Figure 10B:
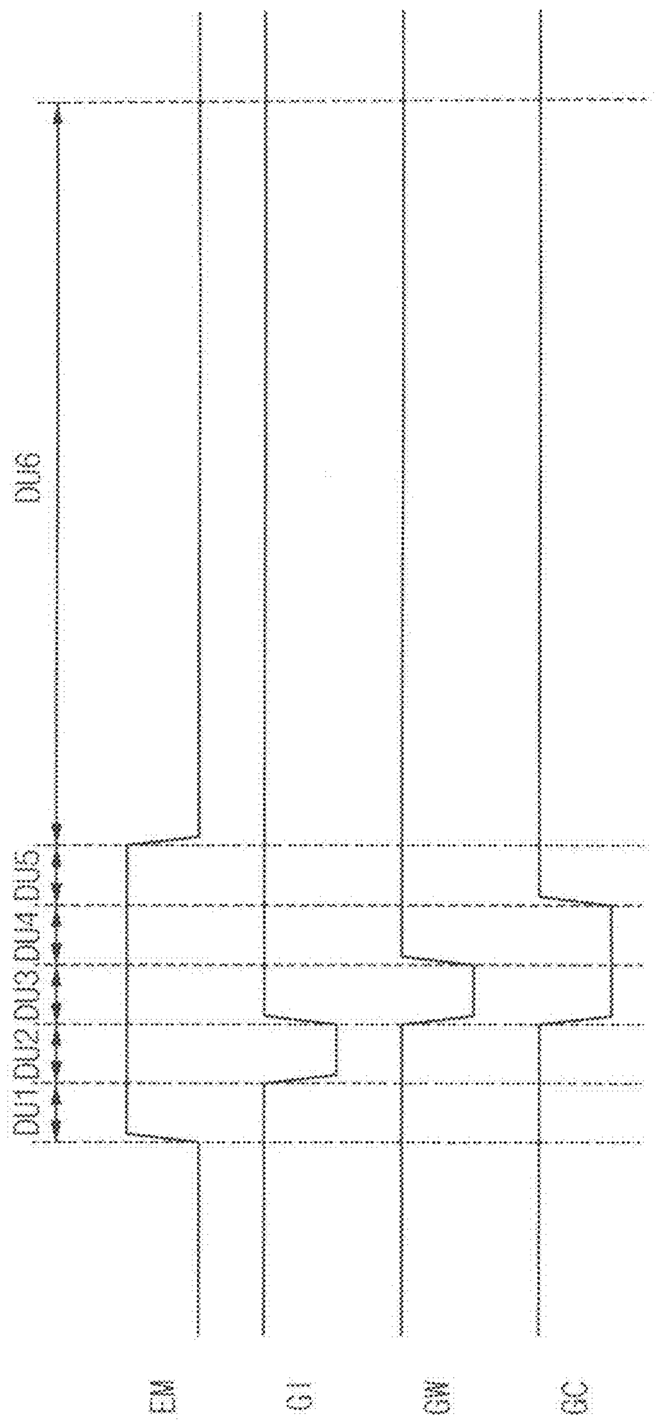
FIG. 10B is a timing diagram illustrating examples of input signals applied to the pixel of FIG. 2, and an example of a node voltage of the pixel in the high frequency driving mode.

FIG. 10A is a timing diagram illustrating examples of input signals applied to the pixel of FIG. 2, and an example of a node voltage of the pixel in the low frequency driving mode. FIG. 10B is a timing diagram illustrating examples of input signals applied to the pixel of FIG. 2, and an example of a node voltage of the pixel in the high frequency driving mode.

The display apparatus according to the present embodiment is the same or substantially the same as the display apparatus described above with reference to FIGS. 1, 2, and 5, except for the waveform of the compensation gate signal GC may be different. Thus, the same reference numerals are used to refer to the same or substantially the same (or similar or like) parts as those described above with reference to FIGS. 1, 2, and 5, and redundant description thereof may not be repeated.

In FIGS. 10A and 10B, the waveform of the compensation gate signal GC in the low frequency driving mode and in the high frequency driving mode may be different (e.g., may be differently set) from each other.

When a driving frequency is less than a reference frequency, the falling waveform of the compensation gate signal GC and the rising waveform of the compensation gate signal GC may be asymmetrical or substantially asymmetrical (e.g., may be set asymmetrically or substantially asymmetrically) with each other. When the driving frequency is equal to or greater than the reference frequency, the falling waveform of the compensation gate signal GC and the rising waveform of the compensation gate signal GC may be symmetrical or substantially symmetrical (e.g., may be set symmetrically or substantially symmetrically) with each other. When the falling waveform of the compensation gate signal GC and the rising waveform of the compensation gate signal GC are symmetrical or substantially symmetrical (e.g., may be set symmetrically or substantially symmetrically) with each other, an absolute value of a falling slew rate of the compensation gate signal GC may be equal to or substantially equal to an absolute value of a rising slew rate of the compensation gate signal GC.

The waveform of the compensation gate signal GC in the driving frequency less than the reference frequency may be the same or substantially the same as the waveform of the compensation gate signal GC shown in FIG. 5. When the driving frequency is less than the reference frequency, the compensation gate signal GC may fall from a high level to a low level, and may rise from the low level to the high level. When the driving frequency is less than the reference frequency, the rising slew rate of the compensation gate signal GC may be less than the falling slew rate of the compensation gate signal GC.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 11A:
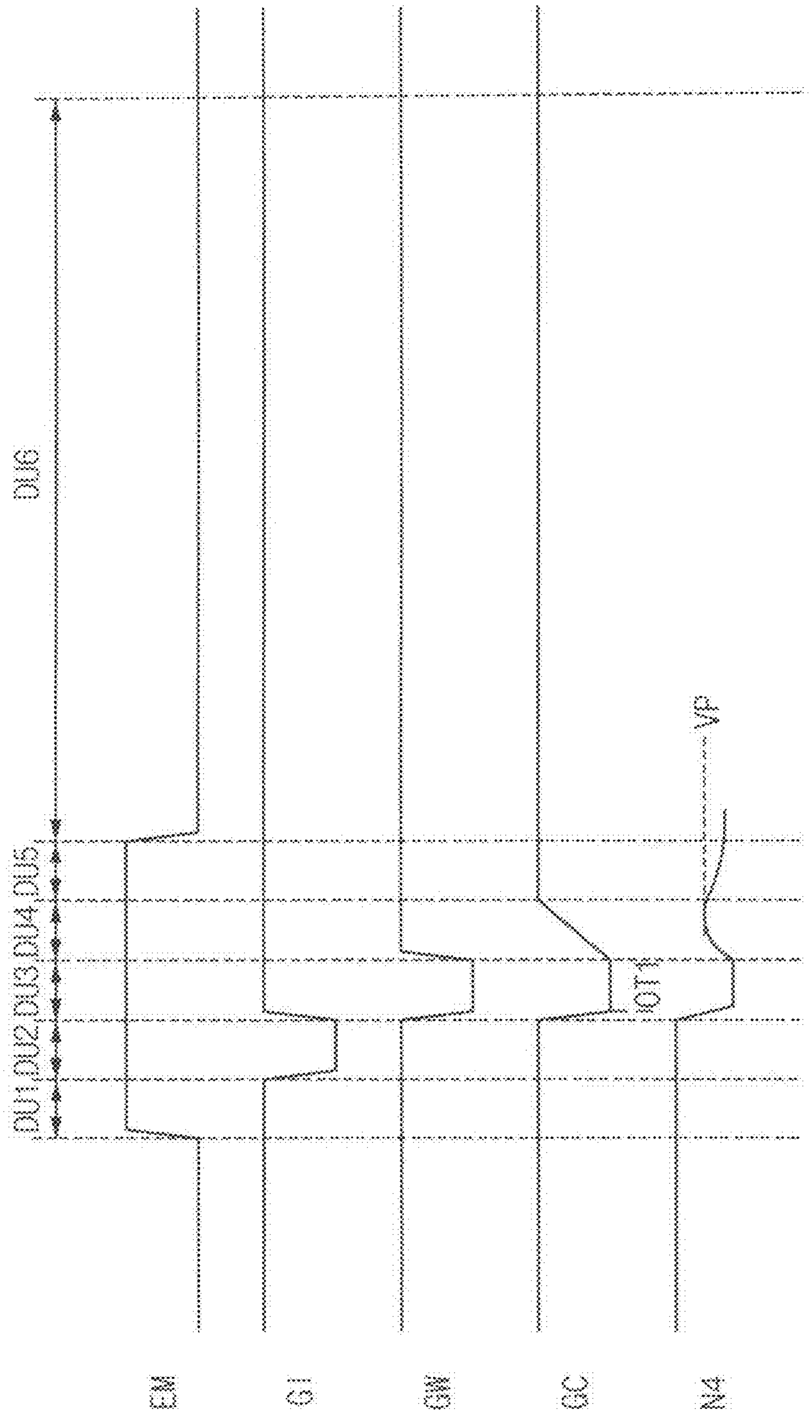
FIG. 11A is a timing diagram illustrating examples of input signals applied to the pixel of FIG. 2, and an example of a node voltage of the pixel in the low frequency driving mode and in the high grayscale value.
Figure 11B:
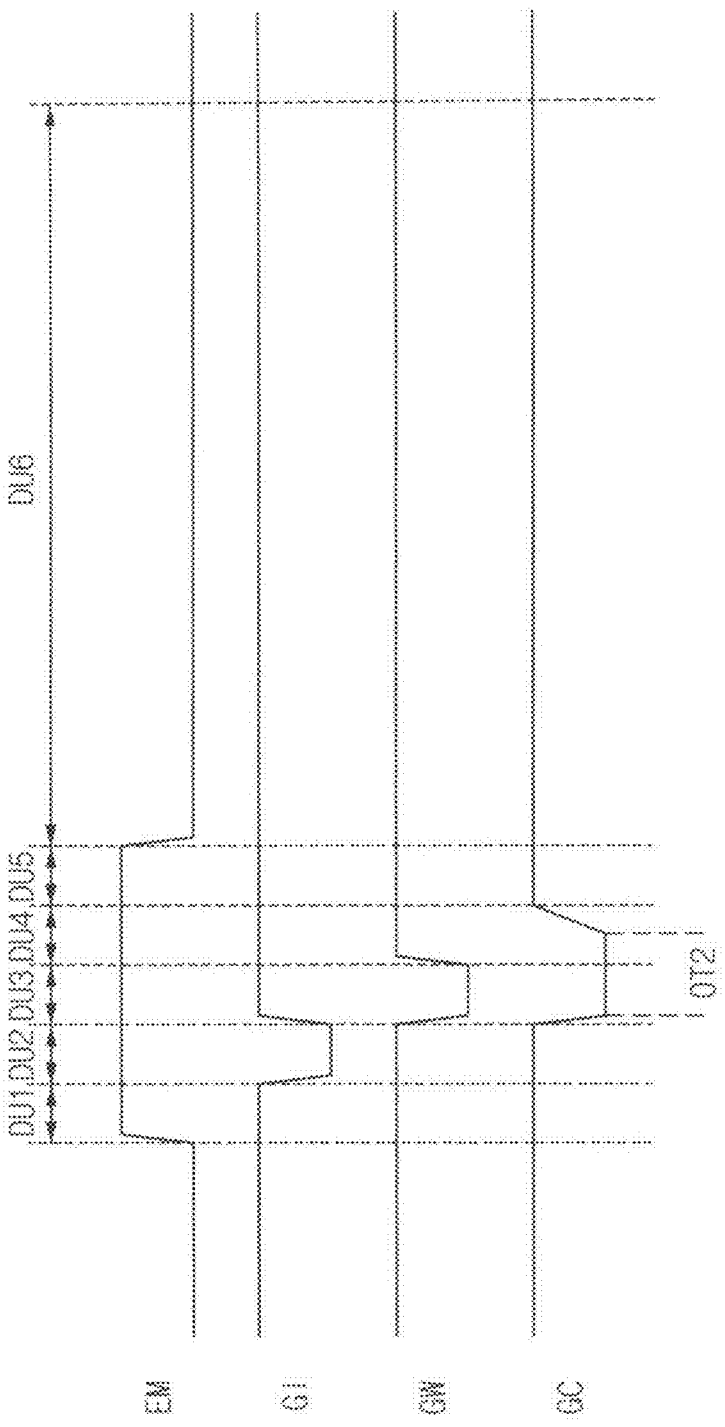
FIG. 11B is a timing diagram illustrating examples of input signals applied to the pixel of FIG. 2, and an example of a node voltage of the pixel in the low frequency driving mode and in the low grayscale value.
Figure 11C:
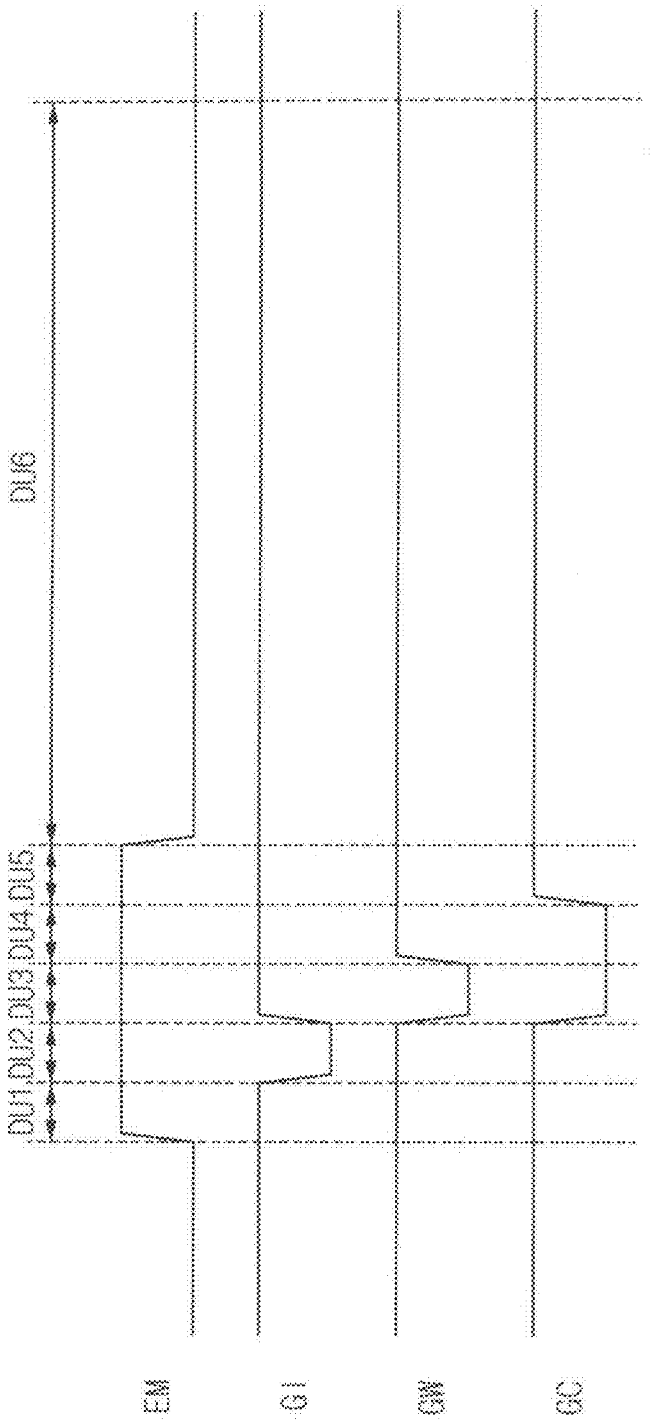
FIG. 11C is a timing diagram illustrating examples of input signals applied to the pixel of FIG. 2, and an example of a node voltage of the pixel in the high frequency driving mode.

FIG. 11A is a timing diagram illustrating examples of input signals applied to the pixel of FIG. 2, and an example of a node voltage of the pixel in the low frequency driving mode and in the high grayscale value. FIG. 11B is a timing diagram illustrating examples of input signals applied to the pixel of FIG. 2, and an example of a node voltage of the pixel in the low frequency driving mode and in the low grayscale value. FIG. 11C is a timing diagram illustrating examples of input signals applied to the pixel of FIG. 2, and an example of a node voltage of the pixel in the high frequency driving mode.

The display apparatus according to the present embodiment is the same or substantially the same as the display apparatus described above with reference to FIGS. 1, 2, 6A, and 6B, except for the waveform of the compensation gate signal GC may be different. Thus, the same reference numerals are used to refer to the same or substantially the same (or similar or like) parts as those described above with reference to FIGS. 1, 2, 6A, and 6B, and redundant description thereof may not be repeated.

In FIGS. 11A, 11B, and 11C, the waveform of the compensation gate signal GC in the low frequency driving mode and in the high frequency driving mode may be different (e.g., may be differently set) from each other.

When a driving frequency is less than a reference frequency, the falling waveform of the compensation gate signal GC and the rising waveform of the compensation gate signal GC may be asymmetrical or substantially asymmetrical (e.g., may be set asymmetrically or substantially asymmetrically) with each other. When the driving frequency is equal to or greater than the reference frequency, the falling waveform of the compensation gate signal GC and the rising waveform of the compensation gate signal GC may be symmetrical or substantially symmetrical (e.g., may be set symmetrically or substantially symmetrically) with each other. When the falling waveform of the compensation gate signal GC and the rising waveform of the compensation gate signal GC are symmetrical or substantially symmetrical (e.g., may be set symmetrically or substantially symmetrically) with each other, an absolute value of a falling slew rate of the compensation gate signal GC may be equal to or substantially equal to an absolute value of a rising slew rate of the compensation gate signal GC.

The waveforms of the compensation gate signal GC in the driving frequency less than the reference frequency may be the same or substantially the same as the waveforms of the compensation gate signal GC shown in FIGS. 6A and 6B. When the driving frequency is less than the reference frequency, the compensation gate signal GC may have a first rising slew rate for a first grayscale value (e.g., the high grayscale value) greater than a reference grayscale value, and the compensation gate signal GC may have a second rising slew rate greater than the first rising slew rate for a second grayscale value (e.g., the low grayscale value) less than the reference grayscale value.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 12A:
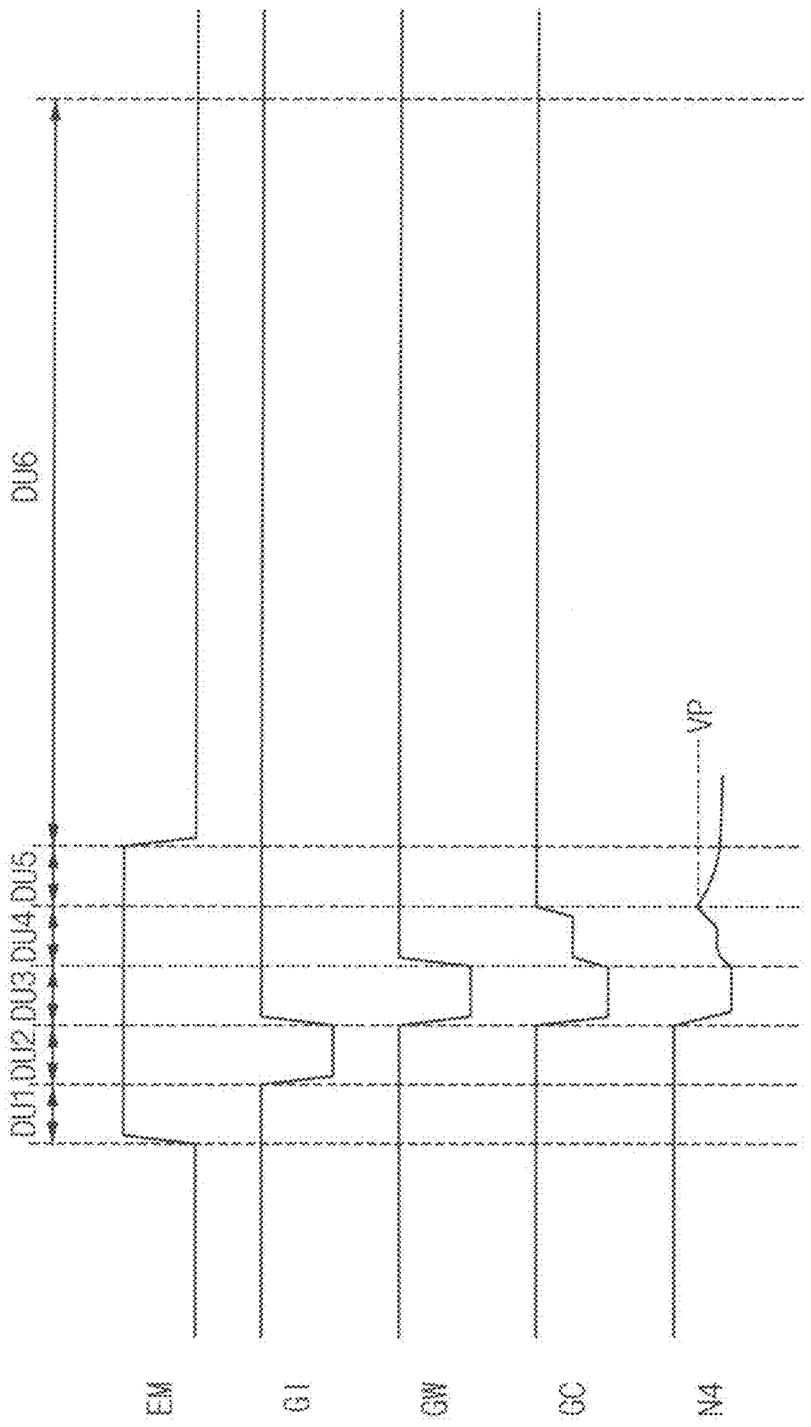
FIG. 12A is a timing diagram illustrating examples of input signals applied to the pixel of FIG. 2, and an example of a node voltage of the pixel in the low frequency driving mode.
Figure 12B:
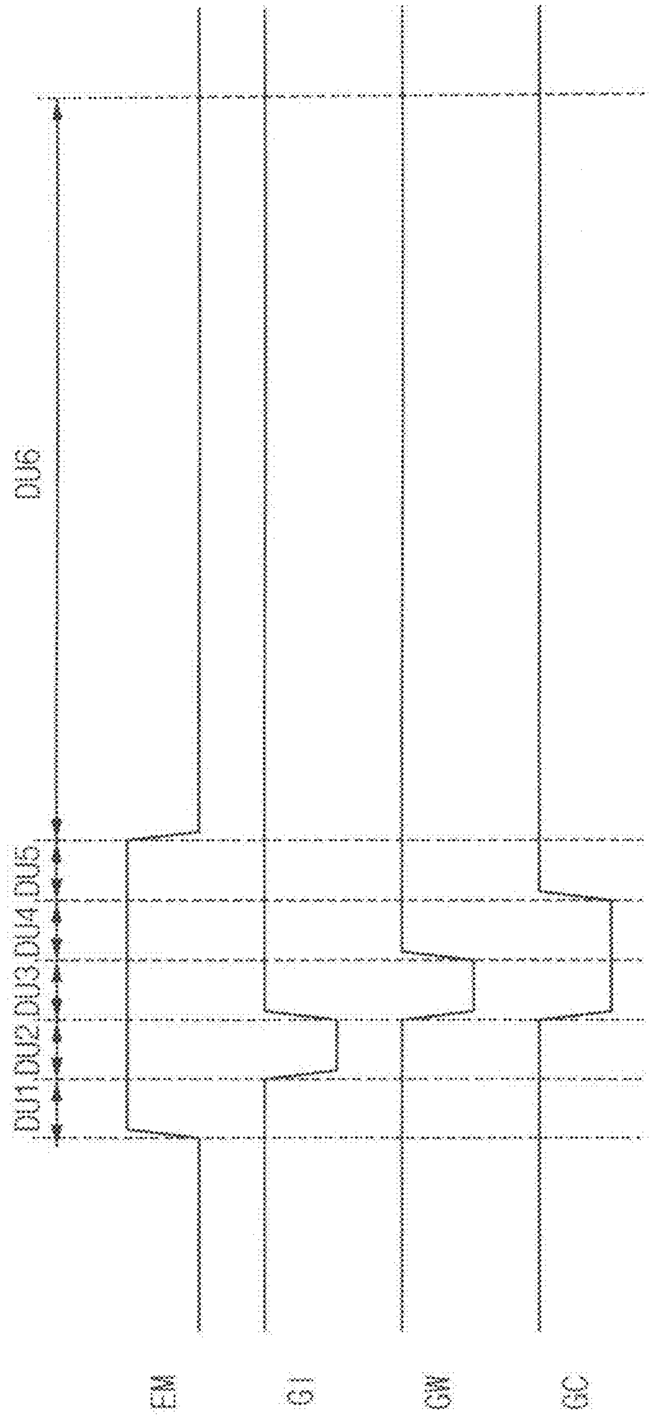
FIG. 12B is a timing diagram illustrating examples of input signals applied to the pixel of FIG. 2, and an example of a node voltage of the pixel in the high frequency driving mode.

FIG. 12A is a timing diagram illustrating examples of input signals applied to the pixel of FIG. 2, and an example of a node voltage of the pixel in the low frequency driving mode. FIG. 12B is a timing diagram illustrating examples of input signals applied to the pixel of FIG. 2, and an example of a node voltage of the pixel in the high frequency driving mode.

The display apparatus according to the present embodiment is the same or substantially the same as the display apparatus described above with reference to FIGS. 1, 2, and 7, except for the waveform of the compensation gate signal GC may be different. Thus, the same reference numerals are used to refer to the same or substantially the same (or similar or like) parts as those described above with reference to FIGS. 1, 2, and 7, and redundant description thereof may not be repeated.

In FIGS. 12A and 12B, the waveform of the compensation gate signal GC in the low frequency driving mode and in the high frequency driving mode may be different (e.g., may be differently set) from each other.

When a driving frequency is less than a reference frequency, the falling waveform of the compensation gate signal GC and the rising waveform of the compensation gate signal GC may be asymmetrical or substantially asymmetrical (e.g., may be set asymmetrically or substantially asymmetrically) with each other. When the driving frequency is equal to or greater than the reference frequency, the falling waveform of the compensation gate signal GC and the rising waveform of the compensation gate signal GC may be symmetrical or substantially symmetrical (e.g., may be set symmetrically or substantially symmetrically) with each other. When the falling waveform of the compensation gate signal GC and the rising waveform of the compensation gate signal GC are symmetrical or substantially symmetrical (e.g., may be set symmetrically or substantially symmetrically) with each other, an absolute value of a falling slew rate of the compensation gate signal GC may be equal to or substantially equal to an absolute value of a rising slew rate of the compensation gate signal GC.

The waveform of the compensation gate signal GC in the driving frequency less than the reference frequency may be the same or substantially the same as the waveform of the compensation gate signal GC shown in FIG. 7. When the driving frequency is less than the reference frequency, the compensation gate signal GC may fall from a high level to a low level, may rise from the low level to an intermediate high level, and may rise from the intermediate high level to the high level.

According to the present embodiment, when the image displayed on the display panel 100 is a static image, or the display panel 100 is operated in the always on mode, the driving frequency of the display panel 100 may be decreased to reduce a power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 13:
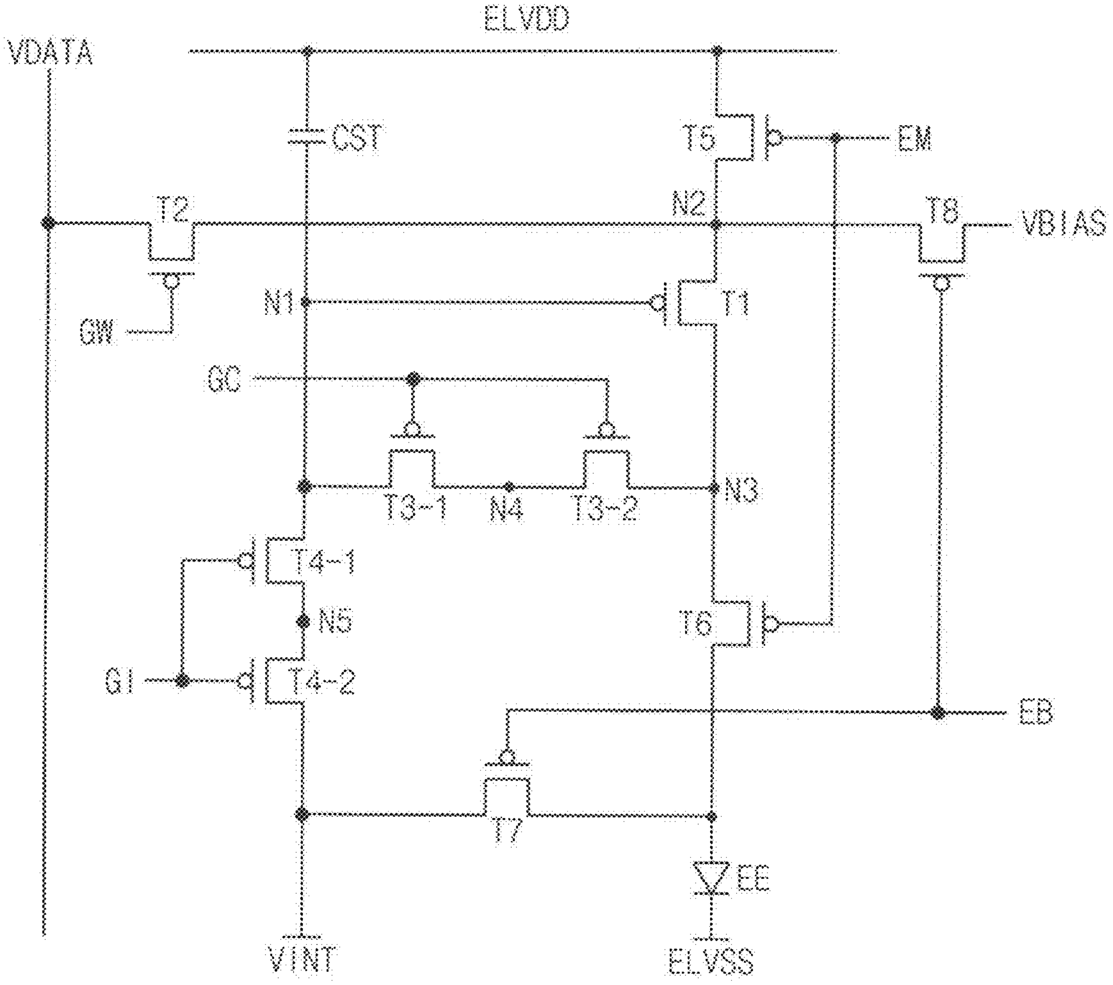
FIG. 13 is a circuit diagram illustrating a pixel of a display panel of a display apparatus according to an embodiment of the present disclosure.

FIG. 13 is a circuit diagram illustrating a pixel of a display panel 100 of a display apparatus according to an embodiment of the present disclosure.

The display apparatus according to the present embodiment is the same or substantially the same as the display apparatus described above with reference to FIGS. 1 to 3, except for the structure of the pixel may be different. Thus, the same reference numerals are used to refer to the same or substantially the same (or similar or like) parts as those described above with reference to FIGS. 1 to 3, and redundant description thereof may not be repeated. The pixel of FIG. 13 is the same or substantially the same as the pixel of FIG. 2, except that the first initialization voltage VINT is applied to the input electrode of the seventh pixel switching element T7, instead of the second initialization voltage VAINT.

Referring to FIGS. 1, 3, and 13, the display panel 100 includes the plurality of the pixels. Each pixel includes a light emitting element EE.

The pixel receives a data writing gate signal GW, a compensation gate signal GC, a data initialization gate signal GI, a light emitting element initialization gate signal EB, the data voltage VDATA, and the emission signal EM. The light emitting element EE of the pixel emits light corresponding to the level of the data voltage VDATA to display an image.

The pixel may include the light emitting element EE, a driving switching element T1 for applying a driving current to the light emitting element EE, and a first compensation switching element T3-1 and a second compensation switching element T3-2 connected between a control electrode of the driving switching element T1 and an output electrode of the driving switching element T1. The first compensation switching element T3-1 and the second compensation switching element T3-2 may be connected to each other in series.

For example, the pixel of the display apparatus may include a first pixel switching element T1 including a control electrode connected to a first node N1, an input electrode connected to a second node N2, and an output electrode connected to a third node N3, a second pixel switching element T1 including a control electrode for receiving the data writing gate signal GW, an input electrode for receiving the data voltage VDATA, and an output electrode connected to the second node N2, a 3-1 pixel switching element T3-1 including a control electrode for receiving the compensation gate signal GC, an input electrode connected to the first node N1, and an output electrode connected to a fourth node N4, a 3-2 pixel switching element T3-2 including a control electrode for receiving the compensation gate signal GC, an input electrode connected to the fourth node N4, and an output electrode connected to the third node N3, a 4-1 pixel switching element T4-1 including a control electrode for receiving the data initialization gate signal GI, an input electrode connected to a fifth node N5, and an output electrode connected to the first node N1, a 4-2 pixel switching element T4-2 including a control electrode for receiving the data initialization gate signal GI, an input electrode for receiving a first initialization voltage VINT, and an output electrode connected to the fifth node N5, a fifth pixel switching element T5 including a control electrode for receiving an emission signal EM, an input electrode for receiving a first power voltage ELVDD, and an output electrode connected to the second node N2, a sixth pixel switching element T6 including a control electrode for receiving the emission signal EM, an input electrode connected to the third node N3, and an output electrode connected to an anode electrode of the light emitting element EE, a seventh pixel switching element T7 including a control electrode for receiving the light emitting element initialization gate signal EB, an input electrode for receiving the first initialization voltage VINT, and an output electrode connected to the anode electrode of the light emitting element EE, an eighth pixel switching element T8 including a control electrode for receiving the light emitting element initialization gate signal EB, an input electrode for receiving a bias voltage VBIAS, and an output electrode connected to the second node N2, a storage capacitor CST including a first electrode for receiving the first power voltage ELVDD, and a second electrode connected to the first node N1, and the light emitting element EE including the anode electrode, and a cathode electrode for receiving a second power voltage ELVSS.

The driving switching element may be the first pixel switching element T1, the first compensation switching element may be the 3-1 pixel switching element T3-1, and the second compensation switching element may be the 3-2 pixel switching element T3-2.

The waveforms of FIGS. 4, 5, 6A, 6B, 7, 8A, 8B, 9A, 9B, 10A, 10B, 11A, 11B, 11C, 12A, and 12B, as well as the waveform of FIG. 3, may be applied to the pixel of the present embodiment.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 14:
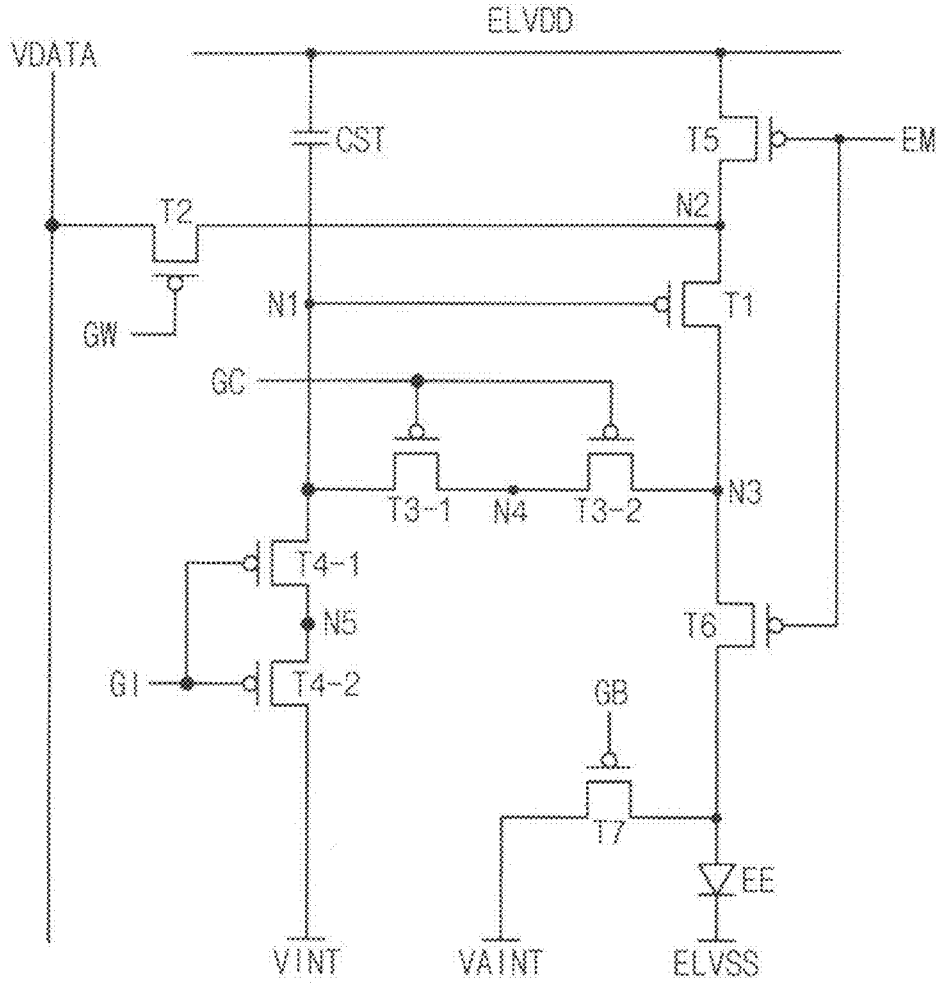
FIG. 14 is a circuit diagram illustrating a pixel of a display panel of a display apparatus according to an embodiment of the present disclosure.

FIG. 14 is a circuit diagram illustrating a pixel of a display panel of a display apparatus according to an embodiment of the present disclosure.

The display apparatus according to the present embodiment is the same or substantially the same as the display apparatus described above with reference to FIGS. 1 to 3, except for the structure of the pixel may be different. Thus, the same reference numerals are used to refer to the same or substantially the same (or similar or like) parts as those described above with reference to FIGS. 1 to 3, and redundant description thereof may not be repeated. The pixel of FIG. 14 is the same or substantially the same as the pixel of FIG. 2, except that the pixel of FIG. 14 does not include the eighth pixel switching element T8.

Referring to FIGS. 1, 3, and 14, the display panel 100 includes the plurality of the pixels. Each pixel includes a light emitting element EE.

The pixel receives a data writing gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include the light emitting element EE, a driving switching element T1 for applying a driving current to the light emitting element EE, and a first compensation switching element T3-1 and a second compensation switching element T3-2 connected between a control electrode of the driving switching element T1 and an output electrode of the driving switching element T1. The first compensation switching element T3-1 and the second compensation switching element T3-2 may be connected to each other in series.

For example, the pixel of the display apparatus may include a first pixel switching element T1 including a control electrode connected to a first node N1, an input electrode connected to a second node N2, and an output electrode connected to a third node N3, a second pixel switching element T1 including a control electrode for receiving the data writing gate signal GW, an input electrode for receiving a data voltage VDATA, and an output electrode connected to the second node N2, a 3-1 pixel switching element T3-1 including a control electrode for receiving the compensation gate signal GC, an input electrode connected to the first node N1, and an output electrode connected to a fourth node N4, a 3-2 pixel switching element T3-2 including a control electrode for receiving the compensation gate signal GC, an input electrode connected to the fourth node N4, and an output electrode connected to the third node N3, a 4-1 pixel switching element T4-1 including a control electrode for receiving the data initialization gate signal GI, an input electrode connected to a fifth node N5, and an output electrode connected to the first node N1, a 4-2 pixel switching element T4-2 including a control electrode for receiving the data initialization gate signal GI, an input electrode for receiving a first initialization voltage VINT, and an output electrode connected to the fifth node N5, a fifth pixel switching element T5 including a control electrode for receiving an emission signal EM, an input electrode for receiving a first power voltage ELVDD, and an output electrode connected to the second node N2, a sixth pixel switching element T6 including a control electrode for receiving the emission signal EM, an input electrode connected to the third node N3, and an output electrode connected to an anode electrode of the light emitting element EE, a seventh pixel switching element T7 including a control electrode for receiving the light emitting element initialization gate signal GB, an input electrode for receiving a second initialization voltage VAINT, and an output electrode connected to the anode electrode of the light emitting element EE, a storage capacitor CST including a first electrode for receiving the first power voltage ELVDD, and a second electrode connected to the first node N1, and the light emitting element EE including the anode electrode, and a cathode electrode for receiving a second power voltage ELVSS.

The driving switching element may be the first pixel switching element T1, the first compensation switching element may be the 3-1 pixel switching element T3-1, and the second compensation switching element may be the 3-2 pixel switching element T3-2.

The waveforms of FIGS. 4, 5, 6A, 6B, 7, 8A, 8B, 9A, 9B, 10A, 10B, 11A, 11B, 11C, 12A, and 12B, as well as the waveform of FIG. 3, may be applied to the pixel of the present embodiment.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

Figure 15:
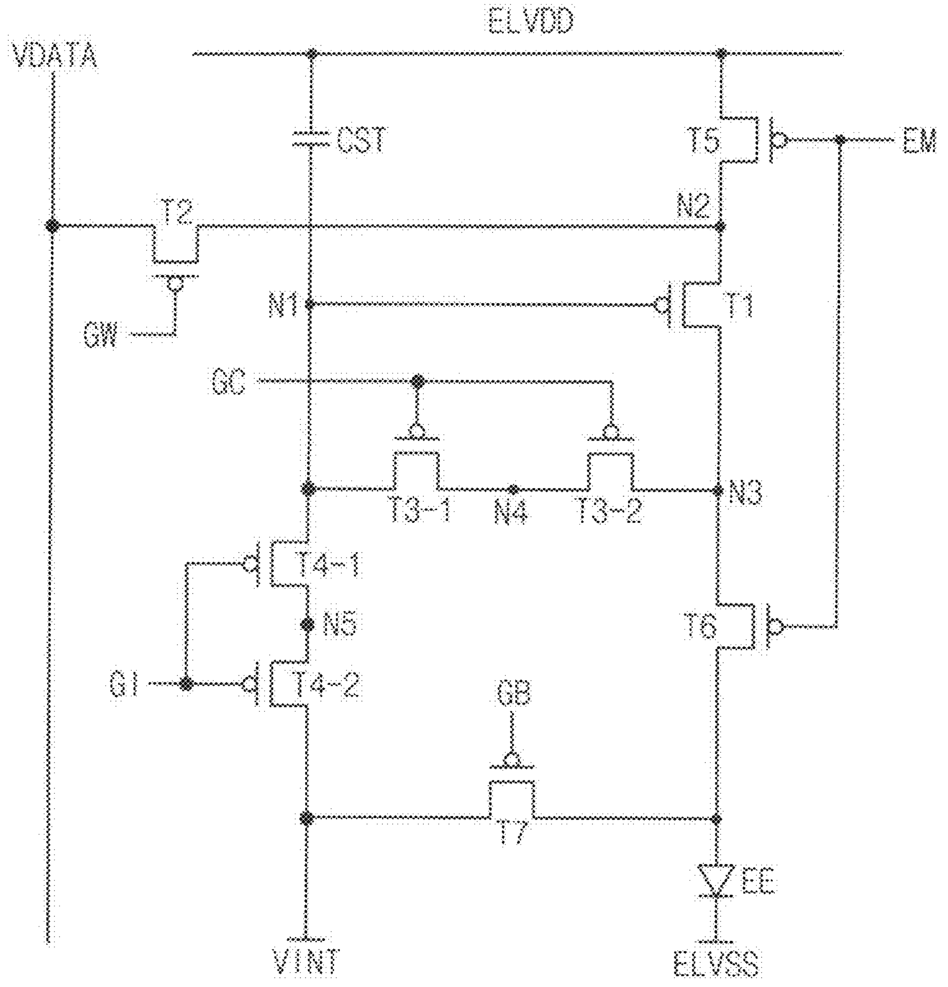
FIG. 15 is a circuit diagram illustrating a pixel of a display panel of a display apparatus according to an embodiment of the present disclosure.

FIG. 15 is a circuit diagram illustrating a pixel of a display panel of a display apparatus according to an embodiment of the present disclosure.

The display apparatus according to the present embodiment is the same or substantially the same as the display apparatus described above with reference to FIGS. 1 to 3, except for the structure of the pixel may be different. Thus, the same reference numerals are used to refer to the same or substantially the same (or similar or like) parts as those described above with reference to FIGS. 1 to 3, and redundant description thereof may not be repeated. The pixel of FIG. 15 is the same or substantially the same as the pixel of FIG. 2, except that the pixel does not include the eighth pixel switching element T8, and the first initialization voltage VINT is applied to the input electrode of the seventh pixel switching element T7, instead of the second initialization voltage VAINT.

Referring to FIGS. 1, 3, and 15, the display panel 100 includes the plurality of the pixels. Each pixel includes a light emitting element EE.

The pixel receives a data writing gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include the light emitting element EE, a driving switching element T1 for applying a driving current to the light emitting element EE, and a first compensation switching element T3-1 and a second compensation switching element T3-2 connected between a control electrode of the driving switching element T1 and an output electrode of the driving switching element T1. The first compensation switching element T3-1 and the second compensation switching element T3-2 may be connected to each other in series.

For example, the pixel of the display apparatus may include a first pixel switching element T1 including a control electrode connected to a first node N1, an input electrode connected to a second node N2, and an output electrode connected to a third node N3, a second pixel switching element T1 including a control electrode for receiving the data writing gate signal GW, an input electrode for receiving a data voltage VDATA, and an output electrode connected to the second node N2, a 3-1 pixel switching element T3-1 including a control electrode for receiving the compensation gate signal GC, an input electrode connected to the first node N1, and an output electrode connected to a fourth node N4, a 3-2 pixel switching element T3-2 including a control electrode for receiving the compensation gate signal GC, an input electrode connected to the fourth node N4, and an output electrode connected to the third node N3, a 4-1 pixel switching element T4-1 including a control electrode for receiving the data initialization gate signal GI, an input electrode connected to a fifth node N5, and an output electrode connected to the first node N1, a 4-2 pixel switching element T4-2 including a control electrode for receiving the data initialization gate signal GI, an input electrode for receiving a first initialization voltage VINT, and an output electrode connected to the fifth node N5, a fifth pixel switching element T5 including a control electrode for receiving an emission signal EM, an input electrode for receiving a first power voltage ELVDD, and an output electrode connected to the second node N2, a sixth pixel switching element T6 including a control electrode for receiving the emission signal EM, an input electrode connected to the third node N3, and an output electrode connected to an anode electrode of the light emitting element EE, a seventh pixel switching element T7 including a control electrode for receiving the light emitting element initialization gate signal GB, an input electrode for receiving the first initialization voltage VINT, and an output electrode connected to the anode electrode of the light emitting element EE, a storage capacitor CST including a first electrode for receiving the first power voltage ELVDD, and a second electrode connected to the first node N1, and the light emitting element EE including the anode electrode, and a cathode electrode for receiving a second power voltage ELVSS.

The driving switching element may be the first pixel switching element T1, the first compensation switching element may be the 3-1 pixel switching element T3-1, and the second compensation switching element may be the 3-2 pixel switching element T3-2.

The waveforms of FIGS. 4, 5, 6A, 6B, 7, 8A, 8B, 9A, 9B, 10A, 10B, 11A, 11B, 11C, 12A, and 12B, as well as the waveform of FIG. 3, may be applied to the pixel of the present embodiment.

According to the present embodiment, when the image displayed on the display panel 100 is a static image, or the display panel 100 is operated in the always on mode, the driving frequency of the display panel 100 may be decreased to reduce power consumption of the display apparatus.

The falling waveform and the rising waveform of the compensation gate signal GC applied to the control electrodes of the first compensation switching element T3-1 and the second compensation switching element T3-2 are asymmetrical or substantially asymmetrical (e.g., may be set asymmetrically or substantially asymmetrically) with each other, so that the voltage increase of the node N4 between the first compensation switching element T3-1 and the second compensation switching element T3-2 may be prevented or reduced.

The voltage increase of the node N4 between the first compensation switching element T3-1 and the second compensation switching element T3-2 may be prevented or reduced, so that the current leakage of the first compensation switching element T3-1 and the second compensation switching element T3-2 may be prevented or substantially prevented in the low frequency driving mode. Thus, the luminance decrease of the display panel 100 and the flicker of the display panel 100 may be prevented or substantially prevented in the low frequency driving mode, so that the display quality may be enhanced.

According to the display apparatus of one or more embodiments of the present disclosure described above, the power consumption of the display apparatus may be reduced, and the display quality of the display panel may be enhanced.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display apparatus comprising:

a light emitting element;

a driving switching element configured to apply a driving current to the light emitting element; and a first compensation switching element and a second compensation switching element connected in series to each other between a control electrode of the driving switching element and an output electrode of the driving switching element, wherein a control electrode of the first compensation switching element and a control electrode of the second compensation switching element are configured to receive a compensation gate signal, and wherein a falling waveform of the compensation gate signal and a rising waveform of the compensation gate signal are asymmetrical to each other to control a voltage of a node between the first and second compensation switching elements.

2. The display apparatus of claim 1, wherein the compensation gate signal falls from a high level to a low level, wherein the compensation gate signal rises from the low level to an intermediate high level, and wherein the compensation gate signal rises from the intermediate high level to the high level.

3. The display apparatus of claim 2, wherein the compensation gate signal rises from the low level to the intermediate high level, and maintains the intermediate high level by a first half of an emission period, and wherein the compensation gate signal rises from the intermediate high level to the high level, and maintains the high level by a second half of the emission period.

4. The display apparatus of claim 1, wherein the compensation gate signal falls from a high level to a low level, wherein the compensation gate signal rises from the low level to the high level, and wherein, when the compensation gate signal rises from the low level to the high level, the compensation gate signal sequentially has a first rising slew rate, and a second rising slew rate less than the first rising slew rate.

5. The display apparatus of claim 1, wherein the compensation gate signal falls from a high level to a low level, wherein the compensation gate signal rises from the low level to the high level, and wherein a rising slew rate of the compensation gate signal is less than a falling slew rate of the compensation gate signal.

6. The display apparatus of claim 1, wherein the compensation gate signal has a first rising slew rate for a first grayscale value that is greater than a reference grayscale value, and wherein the compensation gate signal has a second rising slew rate greater than the first rising slew rate for a second grayscale value that is less than the reference grayscale value.

7. The display apparatus of claim 6, wherein the compensation gate signal has a first on time for the first grayscale value, and wherein the compensation gate signal has a second on time longer than the first on time for the second grayscale value.

8. The display apparatus of claim 1, further comprising a data writing switching element comprising a control electrode configured to receive a data writing gate signal, an input electrode configured to receive a data voltage, and an output electrode connected to an input electrode of the driving switching element.

9. The display apparatus of claim 8, wherein the compensation gate signal falls when the data writing gate signal falls.

10. The display apparatus of claim 9, further comprising a first initialization switching element and a second initialization switching element connected in series to each other between the control electrode of the driving switching element and an applying node of an initialization voltage.

11. The display apparatus of claim 10, wherein a control electrode of the first initialization switching element and a control electrode of the second initialization switching element are configured to receive a data initialization gate signal, and wherein the compensation gate signal falls when the data initialization gate signal rises.

12. The display apparatus of claim 1, further comprising a pixel comprising:

a first pixel switching element comprising a control electrode connected to a first node, an input electrode connected to a second node, and an output electrode connected to a third node;

a second pixel switching element comprising a control electrode configured to receive a data writing gate signal, an input electrode configured to receive a data voltage, and an output electrode connected to the second node;

a 3-1 pixel switching element comprising a control electrode configured to receive the compensation gate signal, an input electrode connected to the first node, and an output electrode connected to a fourth node;

a 3-2 pixel switching element comprising a control electrode configured to receive the compensation gate signal, an input electrode connected to the fourth node, and an output electrode connected to the third node;

a 4-1 pixel switching element comprising a control electrode configured to receive a data initialization gate signal, an input electrode connected to a fifth node, and an output electrode connected to the first node;

a 4-2 pixel switching element comprising a control electrode configured to receive the data initialization gate signal, an input electrode configured to receive a first initialization voltage, and an output electrode connected to the fifth node;

a fifth pixel switching element comprising a control electrode configured to receive an emission signal, an input electrode configured to receive a first power voltage, and an output electrode connected to the second node;

a sixth pixel switching element comprising a control electrode configured to receive the emission signal, an input electrode connected to the third node, and an output electrode connected to an anode electrode of the light emitting element;

a seventh pixel switching element comprising a control electrode configured to receive a light emitting element initialization gate signal, an input electrode configured to receive a second initialization voltage, and an output electrode connected to the anode electrode of the light emitting element;

an eighth pixel switching element comprising a control electrode configured to receive the light emitting element initialization gate signal, an input electrode configured to receive a bias voltage, and an output electrode connected to the second node;

a storage capacitor comprising a first electrode configured to receive the first power voltage, and a second electrode connected to the first node; and the light emitting element comprising the anode electrode, and a cathode electrode configured to receive a second power voltage, wherein the driving switching element is the first pixel switching element, the first compensation switching element is the 3-1 pixel switching element, and the second compensation switching element is the 3-2 pixel switching element.

13. The display apparatus of claim 1, further comprising a pixel comprising:

a first pixel switching element comprising a control electrode connected to a first node, an input electrode connected to a second node, and an output electrode connected to a third node;

a second pixel switching element comprising a control electrode configured to receive a data writing gate signal, an input electrode configured to receive a data voltage, and an output electrode connected to the second node;

a 3-1 pixel switching element comprising a control electrode configured to receive the compensation gate signal, an input electrode connected to the first node, and an output electrode connected to a fourth node;

a 3-2 pixel switching element comprising a control electrode configured to receive the compensation gate signal, an input electrode connected to the fourth node, and an output electrode connected to the third node;

a 4-1 pixel switching element comprising a control electrode configured to receive a data initialization gate signal, an input electrode connected to a fifth node, and an output electrode connected to the first node;

a 4-2 pixel switching element comprising a control electrode configured to receive the data initialization gate signal, an input electrode configured to receive a first initialization voltage, and an output electrode connected to the fifth node;

a fifth pixel switching element comprising a control electrode configured to receive an emission signal, an input electrode configured to receive a first power voltage, and an output electrode connected to the second node;

a sixth pixel switching element comprising a control electrode configured to receive the emission signal, an input electrode connected to the third node, and an output electrode connected to an anode electrode of the light emitting element;

a seventh pixel switching element comprising a control electrode configured to receive a light emitting element initialization gate signal, an input electrode configured to receive the first initialization voltage, and an output electrode connected to the anode electrode of the light emitting element;

an eighth pixel switching element comprising a control electrode configured to receive the light emitting element initialization gate signal, an input electrode configured to receive a bias voltage, and an output electrode connected to the second node;

a storage capacitor comprising a first electrode configured to receive the first power voltage, and a second electrode connected to the first node; and the light emitting element comprising the anode electrode, and a cathode electrode configured to receive a second power voltage, wherein the driving switching element is the first pixel switching element, the first compensation switching element is the 3-1 pixel switching element, and the second compensation switching element is the 3-2 pixel switching element.

14. The display apparatus of claim 1, further comprising a pixel comprising:

a first pixel switching element comprising a control electrode connected to a first node, an input electrode connected to a second node, and an output electrode connected to a third node;

a second pixel switching element comprising a control electrode configured to receive a data writing gate signal, an input electrode configured to receive a data voltage, and an output electrode connected to the second node;

a 3-1 pixel switching element comprising a control electrode configured to receive the compensation gate signal, an input electrode connected to the first node, and an output electrode connected to a fourth node;

a 3-2 pixel switching element comprising a control electrode configured to receive the compensation gate signal, an input electrode connected to the fourth node, and an output electrode connected to the third node;

a 4-1 pixel switching element comprising a control electrode configured to receive a data initialization gate signal, an input electrode connected to a fifth node, and an output electrode connected to the first node;

a 4-2 pixel switching element comprising a control electrode configured to receive the data initialization gate signal, an input electrode configured to receive a first initialization voltage, and an output electrode connected to the fifth node;

a fifth pixel switching element comprising a control electrode configured to receive an emission signal, an input electrode configured to receive a first power voltage, and an output electrode connected to the second node;

a sixth pixel switching element comprising a control electrode configured to receive the emission signal, an input electrode connected to the third node, and an output electrode connected to an anode electrode of the light emitting element;

a seventh pixel switching element comprising a control electrode configured to receive a light emitting element initialization gate signal, an input electrode configured to receive a second initialization voltage, and an output electrode connected to the anode electrode of the light emitting element;

a storage capacitor comprising a first electrode configured to receive the first power voltage, and a second electrode connected to the first node; and the light emitting element comprising the anode electrode, and a cathode electrode configured to receive a second power voltage, wherein the driving switching element is the first pixel switching element, the first compensation switching element is the 3-1 pixel switching element, and the second compensation switching element is the 3-2 pixel switching element.

15. The display apparatus of claim 1, further comprising a pixel comprising:

a first pixel switching element comprising a control electrode connected to a first node, an input electrode connected to a second node, and an output electrode connected to a third node;

a second pixel switching element comprising a control electrode configured to receive a data writing gate signal, an input electrode configured to receive a data voltage, and an output electrode connected to the second node;

a 3-1 pixel switching element comprising a control electrode configured to receive the compensation gate signal, an input electrode connected to the first node, and an output electrode connected to a fourth node;

a 3-2 pixel switching element comprising a control electrode configured to receive the compensation gate signal, an input electrode connected to the fourth node, and an output electrode connected to the third node;

a 4-1 pixel switching element comprising a control electrode configured to receive a data initialization gate signal, an input electrode connected to a fifth node, and an output electrode connected to the first node;

a 4-2 pixel switching element comprising a control electrode configured to receive the data initialization gate signal, an input electrode configured to receive a first initialization voltage, and an output electrode connected to the fifth node;

a fifth pixel switching element comprising a control electrode configured to receive an emission signal, an input electrode configured to receive a first power voltage, and an output electrode connected to the second node;

a sixth pixel switching element comprising a control electrode configured to receive the emission signal, an input electrode connected to the third node, and an output electrode connected to an anode electrode of the light emitting element;

a seventh pixel switching element comprising a control electrode configured to receive a light emitting element initialization gate signal, an input electrode configured to receive the first initialization voltage, and an output electrode connected to the anode electrode of the light emitting element;

a storage capacitor comprising a first electrode configured to receive the first power voltage, and a second electrode connected to the first node; and the light emitting element comprising the anode electrode, and a cathode electrode configured to receive a second power voltage, wherein the driving switching element is the first pixel switching element, the first compensation switching element is the 3-1 pixel switching element, and the second compensation switching element is the 3-2 pixel switching element.

16. A method of driving a display apparatus, the method comprising:

providing a data writing gate signal and a compensation gate signal to a pixel;

providing a data voltage to the pixel; and providing an emission signal to the pixel, wherein the pixel comprises:

a light emitting element;

a driving switching element configured to apply a driving current to the light emitting element; and a first compensation switching element and a second compensation switching element connected in series to each other between a control electrode of the driving switching element and an output electrode of the driving switching element, wherein a control electrode of the first compensation switching element and a control electrode of the second compensation switching element are configured to receive the compensation gate signal, and wherein a falling waveform of the compensation gate signal and a rising waveform of the compensation gate signal are asymmetrical to each other to control a voltage of a node between the first and second compensation switching elements.

* * * * *